US012696322B2

(12) United States Patent
Abotabl et al.

(10) Patent No.: US 12,696,322 B2
(45) Date of Patent: Jul. 28, 2026

(54) TECHNIQUES FOR ADAPTATION OF RANDOM ACCESS CONFIGURATION IN WIRELESS COMMUNICATIONS

(71) Applicant: QUALCOMM Incorporated, San Diego, CA (US)

(72) Inventors: Ahmed Attia Abotabl, San Diego, CA (US); Navid Abedini, Basking Ridge, NJ (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/628,321

(22) Filed: Apr. 5, 2024

(65) Prior Publication Data

US 2025/0317979 A1    Oct. 9, 2025

(51) Int. Cl.
  *H04W 74/0833*      (2024.01)
  *H04W 72/0446*      (2023.01)
  *H04W 74/00*        (2009.01)

(52) U.S. Cl.
  CPC ...  *H04W 74/0833* (2013.01); *H04W 72/0446* (2013.01); *H04W 74/002* (2013.01)

(58) Field of Classification Search
  CPC ..................................... H04W 74/0833–0891
  See application file for complete search history.

(56) References Cited

U.S. PATENT DOCUMENTS

2018/0249510 A1 * 8/2018 Lee ................... H04W 74/0833
2018/0367200 A1   12/2018 Wiberg et al.

2019/0254076 A1 * 8/2019 Siomina .............. H04W 74/002
2020/0267764 A1 * 8/2020 Rastegardoost .... H04W 74/006
2020/0383141 A1 * 12/2020 Lei .................... H04W 74/0808
2021/0211941 A1 * 7/2021 Jiang ...................... H04L 5/0098
2021/0266982 A1 * 8/2021 Guo ................. H04W 74/0833
2021/0392692 A1 * 12/2021 Sakhnini ............. H04W 74/002
2022/0150974 A1 * 5/2022 Kim ................... H04W 74/006
2022/0312488 A1 * 9/2022 Abedini ............. H04W 74/002

(Continued)

FOREIGN PATENT DOCUMENTS

WO     WO-2022081074 A1 *  4/2022   ........ H04W 74/0833

OTHER PUBLICATIONS

International Search Report and Written Opinion—PCT/US2025/019418—ISA/EPO—Jul. 4, 2025 (2402549WO).

*Primary Examiner* — Brendan Y Higa
(74) *Attorney, Agent, or Firm* — Holland & Hart LLP/Qualcomm Incorporated

(57)     ABSTRACT

Methods, systems, and devices for wireless communications are described that provide for adaptation of a physical random access channel (PRACH) configuration to change a quantity of random access occasions (ROs) available for transmission of a random access message from a user equipment (UE) subsequent to receipt of a signal at the UE. The PRACH configuration may be adapted to provide an increased quantity of ROs for a time duration subsequent to the receipt of the signal at the UE. The timing for starting the adapted PRACH configuration may be at a start of a subsequent RO pattern within an association pattern period, at a start of a subsequent paging association pattern period, or a certain number of milliseconds or frames subsequent to the signaling that indicates the adapted PRACH configuration.

30 Claims, 20 Drawing Sheets

(56) References Cited

U.S. PATENT DOCUMENTS

| | | | | |
|---|---|---|---|---|
| 2022/0338264 A1* | 10/2022 | Ko | ......................... | H04W 16/14 |
| 2023/0116886 A1* | 4/2023 | Kim | ...................... | H04W 16/18 |
| | | | | 370/328 |
| 2023/0171810 A1* | 6/2023 | Belleschi | .......... | H04W 74/0833 |
| | | | | 370/329 |
| 2023/0180300 A1* | 6/2023 | Lin | ....................... | H04W 48/16 |
| | | | | 370/329 |
| 2023/0180301 A1* | 6/2023 | Seidel | ............... | H04W 74/0833 |
| | | | | 370/329 |
| 2024/0381440 A1* | 11/2024 | Zhu | ................... | H04W 74/0833 |
| 2025/0039941 A1* | 1/2025 | Hu | ........................ | H04L 5/0051 |
| 2025/0247824 A1* | 7/2025 | Hu | ...................... | H04W 56/001 |
| 2025/0267711 A1* | 8/2025 | Ly | ....................... | H04W 74/006 |
| 2025/0317978 A1* | 10/2025 | Abotabl | ............ | H04W 74/0833 |
| 2025/0317980 A1* | 10/2025 | Abotabl | ............ | H04W 74/0833 |
| 2025/0317981 A1* | 10/2025 | Abotabl | ................ | H04W 48/08 |

* cited by examiner

Random Access Configuration Manager

925

Random Access Adaptation Manager

930

Random Access Transmission Component

935

920

900

130

105

115

Network Entity

Transceiver

1410

Antenna

1415

Communications Manager

1420

Memory

Code

1430

1425

1440

Processor

1435

1405

1400

Figure 15:
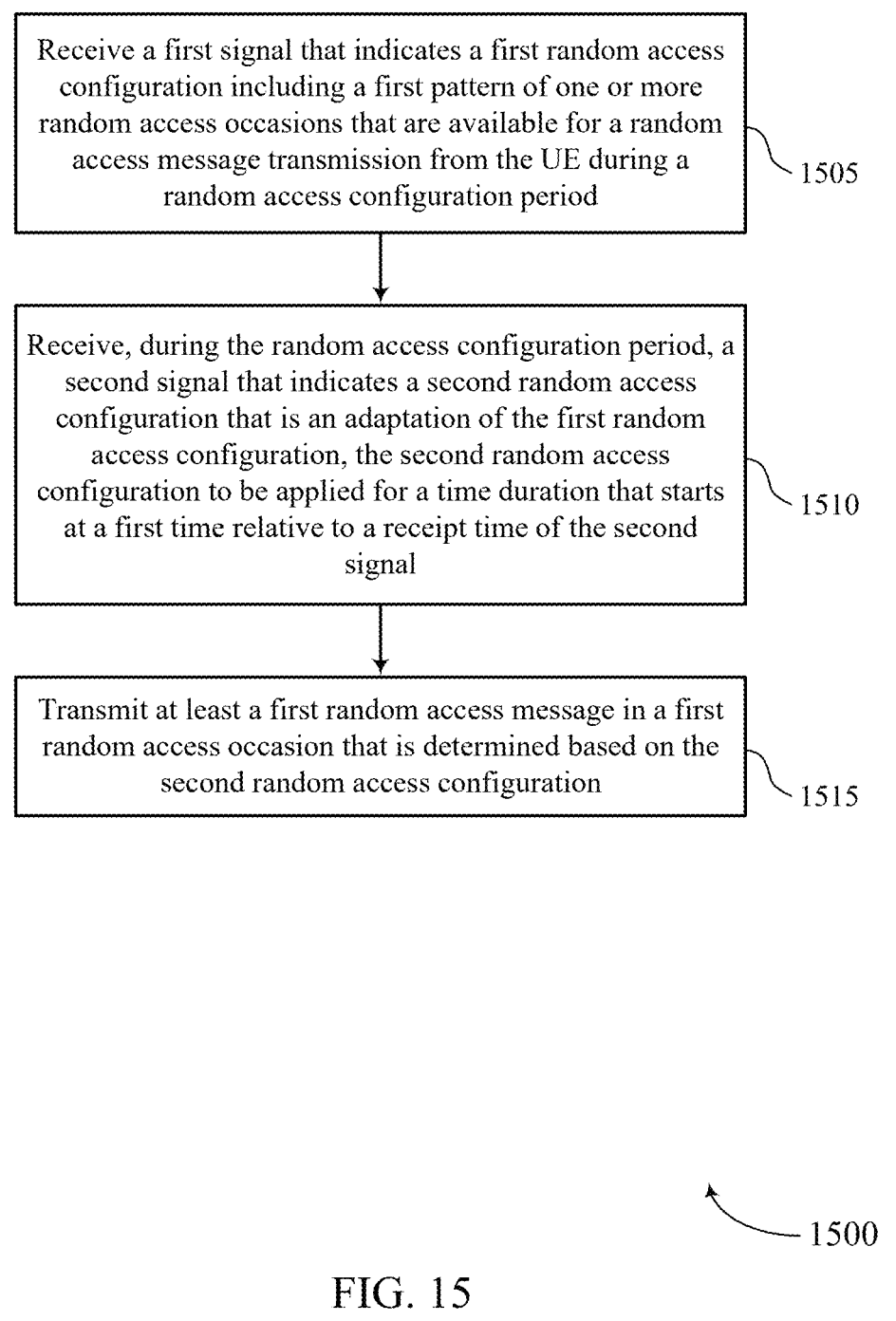

Receive a first signal that indicates a first random access configuration including a first pattern of one or more random access occasions that are available for a random access message transmission from the UE during a random access configuration period

1505

Receive, during the random access configuration period, a second signal that indicates a second random access configuration that is an adaptation of the first random access configuration, the second random access configuration to be applied for a time duration that starts at a first time relative to a receipt time of the second signal

1510

Transmit at least a first random access message in a first random access occasion that is determined based on the second random access configuration

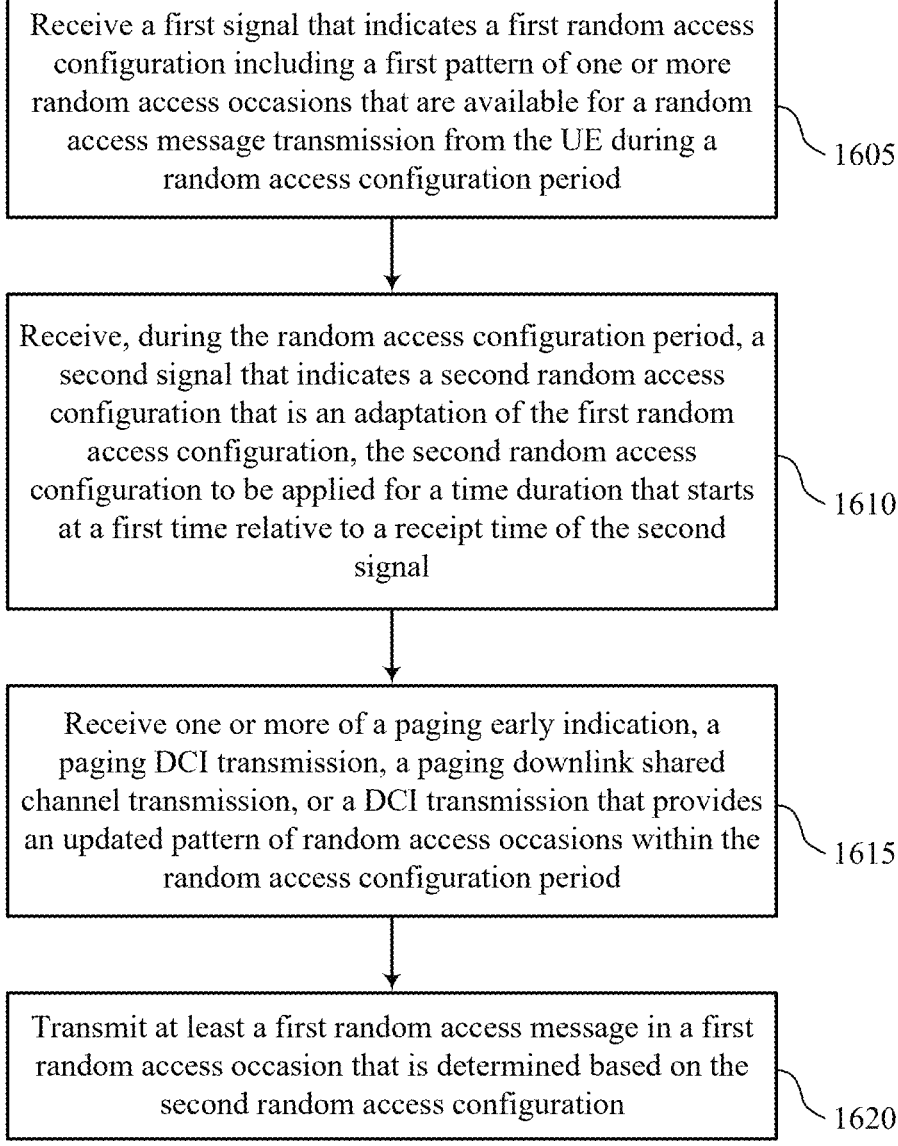

Receive a first signal that indicates a first random access configuration including a first pattern of one or more random access occasions that are available for a random access message transmission from the UE during a random access configuration period

1605

Receive, during the random access configuration period, a second signal that indicates a second random access configuration that is an adaptation of the first random access configuration, the second random access configuration to be applied for a time duration that starts at a first time relative to a receipt time of the second signal

1610

Receive one or more of a paging early indication, a paging DCI transmission, a paging downlink shared channel transmission, or a DCI transmission that provides an updated pattern of random access occasions within the random access configuration period

1615

Transmit at least a first random access message in a first random access occasion that is determined based on the second random access configuration

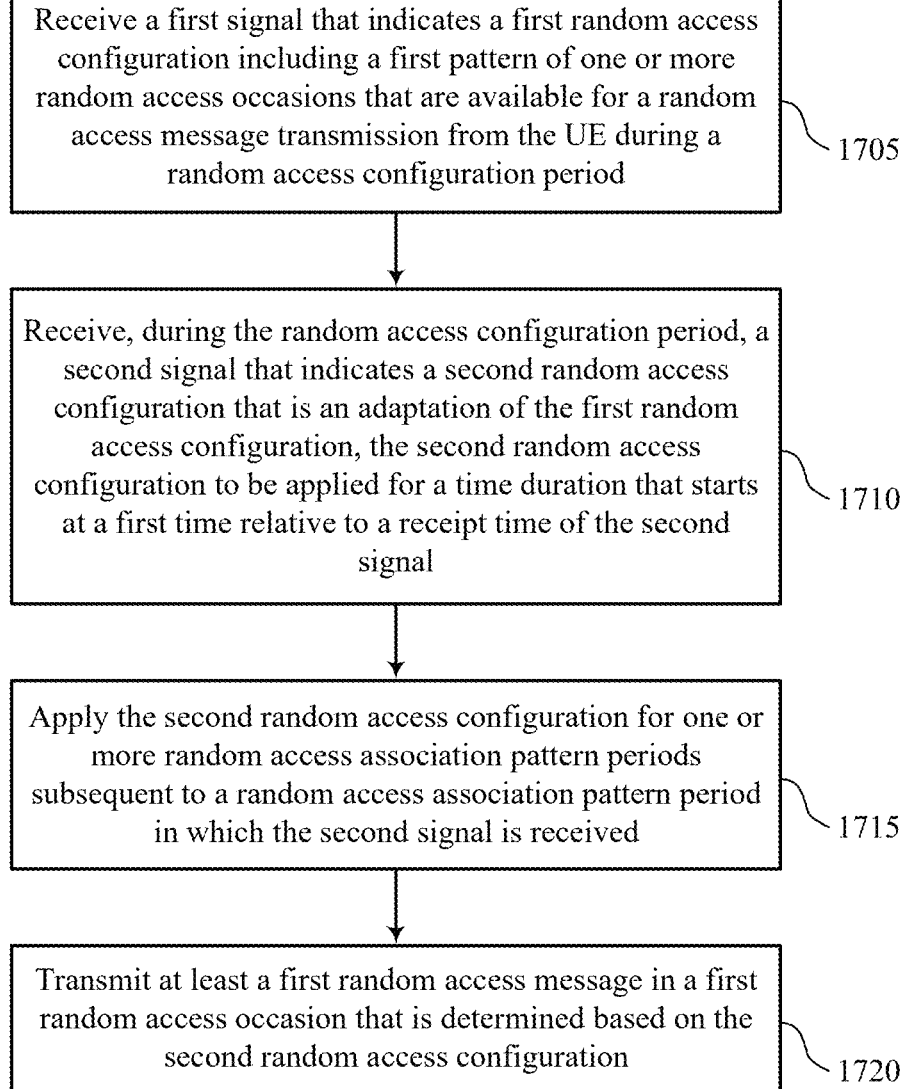

Receive a first signal that indicates a first random access configuration including a first pattern of one or more random access occasions that are available for a random access message transmission from the UE during a random access configuration period

1705

Receive, during the random access configuration period, a second signal that indicates a second random access configuration that is an adaptation of the first random access configuration, the second random access configuration to be applied for a time duration that starts at a first time relative to a receipt time of the second signal

1710

Apply the second random access configuration for one or more random access association pattern periods subsequent to a random access association pattern period in which the second signal is received

1715

Transmit at least a first random access message in a first random access occasion that is determined based on the second random access configuration

Figure 18:
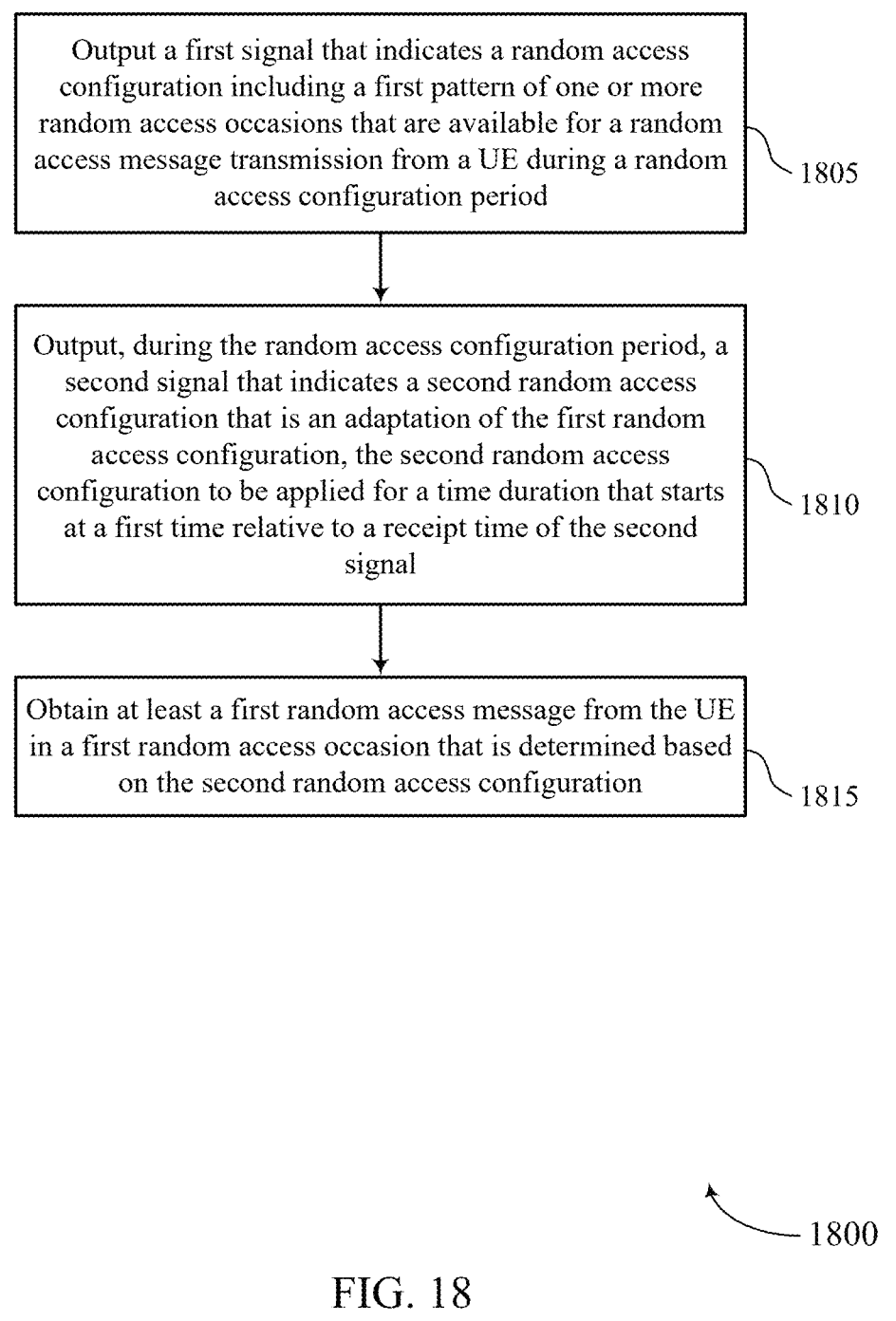

Output a first signal that indicates a random access configuration including a first pattern of one or more random access occasions that are available for a random access message transmission from a UE during a random access configuration period

1805

Output, during the random access configuration period, a second signal that indicates a second random access configuration that is an adaptation of the first random access configuration, the second random access configuration to be applied for a time duration that starts at a first time relative to a receipt time of the second signal

1810

Obtain at least a first random access message from the UE in a first random access occasion that is determined based on the second random access configuration

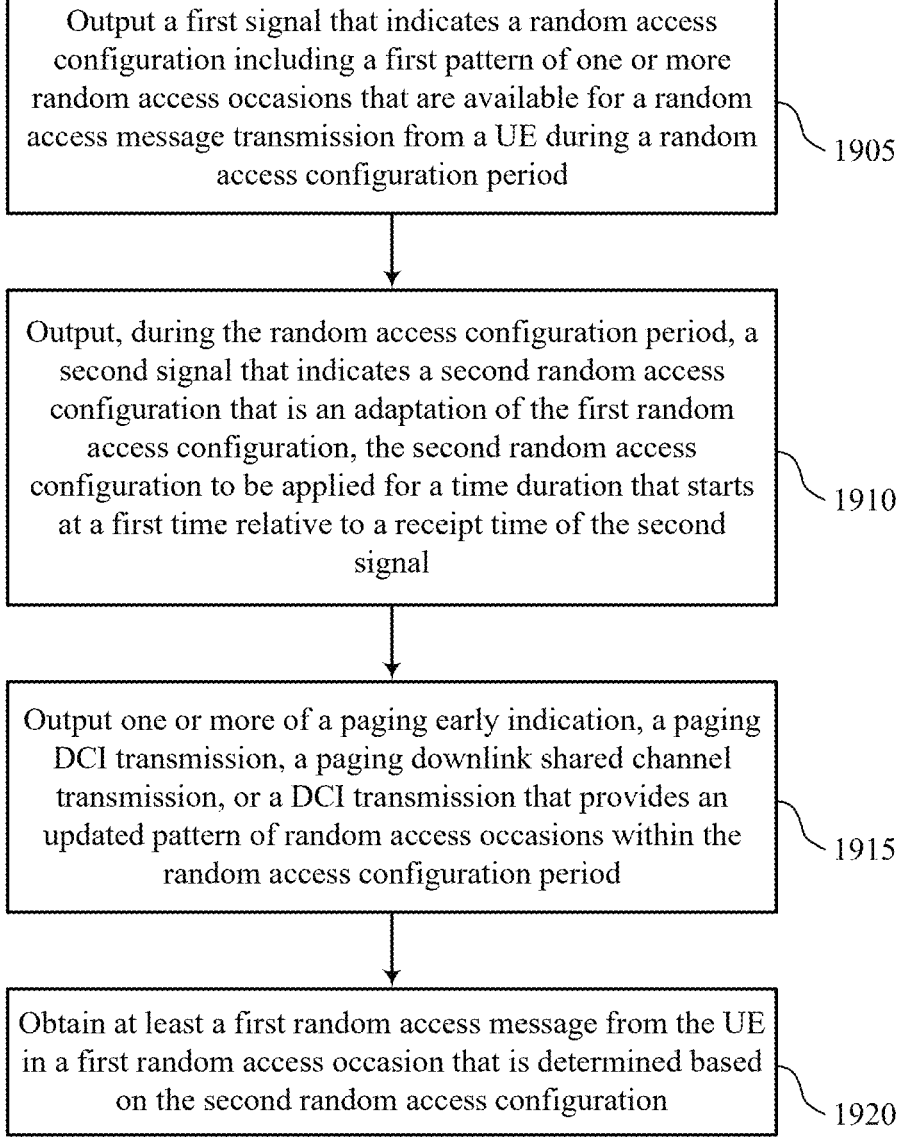

Output a first signal that indicates a random access configuration including a first pattern of one or more random access occasions that are available for a random access message transmission from a UE during a random access configuration period
1905

Output, during the random access configuration period, a second signal that indicates a second random access configuration that is an adaptation of the first random access configuration, the second random access configuration to be applied for a time duration that starts at a first time relative to a receipt time of the second signal
1910

Output one or more of a paging early indication, a paging DCI transmission, a paging downlink shared channel transmission, or a DCI transmission that provides an updated pattern of random access occasions within the random access configuration period
1915

Obtain at least a first random access message from the UE in a first random access occasion that is determined based on the second random access configuration
1920

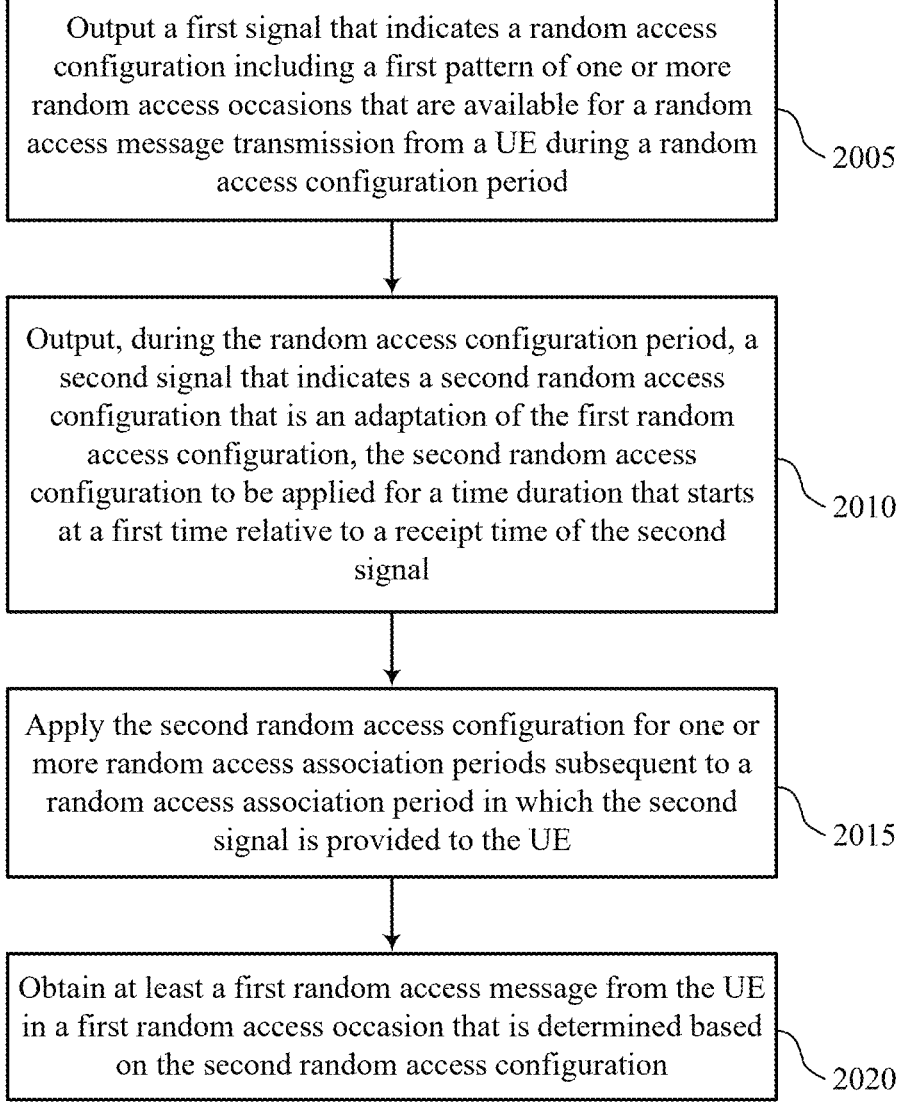

Output a first signal that indicates a random access configuration including a first pattern of one or more random access occasions that are available for a random access message transmission from a UE during a random access configuration period

2005

Output, during the random access configuration period, a second signal that indicates a second random access configuration that is an adaptation of the first random access configuration, the second random access configuration to be applied for a time duration that starts at a first time relative to a receipt time of the second signal

2010

Apply the second random access configuration for one or more random access association periods subsequent to a random access association period in which the second signal is provided to the UE

2015

Obtain at least a first random access message from the UE in a first random access occasion that is determined based on the second random access configuration

TECHNIQUES FOR ADAPTATION OF RANDOM ACCESS CONFIGURATION IN WIRELESS COMMUNICATIONS

FIELD OF TECHNOLOGY

The following relates to wireless communications, including techniques for adaptation of random access configuration in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for adaptation of random access configuration in wireless communications. For example, the described techniques provide for adaptation of a physical random access channel (PRACH) configuration to change a quantity of random access occasions (ROs) available for transmission of a random access message from a user equipment (UE) subsequent to receipt of a signal at the UE. In some aspects, a quantity of ROs may be increased for a time duration subsequent to the receipt of the signal at the UE, which may reduce a latency for UE access to a network entity in response to receiving the signal. In some aspects, signaling that indicates the adaptation of the PRACH configuration may provide an implicit indication such as a paging message (e.g., in a paging early indicator (PEI), paging downlink control information (DCI), or paging physical downlink shared channel (PDSCH) transmission), or an explicit indication that provides an updated RO pattern (e.g., a DCI that provides an updated RO pattern). The timing for starting the adapted or updated PRACH configuration, in some aspects, may be at a start of a subsequent RO pattern within an association pattern period, at a start of a subsequent paging association pattern period, or a certain number of milliseconds or frames subsequent to the signaling that indicates the adapted PRACH configuration. In some aspects, the adapted PRACH configuration may be valid for the subsequent RO pattern within the paging association pattern period, the subsequent paging association pattern period, until an updated PRACH configuration is provided, or for a certain number of milliseconds or frames. In some cases, a DCI may indicate an updated pattern of ROs within a PRACH association pattern period.

A method for wireless communications by a user equipment (UE) is described. The method may include receiving a first signal that indicates a first random access configuration including a first pattern of one or more random access occasions that are available for a random access message transmission from the UE during a random access configuration period, receiving, during the random access configuration period, a second signal that indicates a second random access configuration that is an adaptation of the first random access configuration, the second random access configuration to be applied for a time duration that starts at a first time relative to a receipt time of the second signal, and transmitting at least a first random access message in a first random access occasion that is determined based on the second random access configuration.

A UE for wireless communications is described. The UE may include one or more memories storing processor executable code, and one or more processors coupled with the one or more memories. The one or more processors may individually or collectively be operable to execute the code to cause the UE to receive a first signal that indicates a first random access configuration including a first pattern of one or more random access occasions that are available for a random access message transmission from the UE during a random access configuration period, receive, during the random access configuration period, a second signal that indicates a second random access configuration that is an adaptation of the first random access configuration, the second random access configuration to be applied for a time duration that starts at a first time relative to a receipt time of the second signal, and transmit at least a first random access message in a first random access occasion that is determined based on the second random access configuration.

Another UE for wireless communications is described. The UE may include means for receiving a first signal that indicates a first random access configuration including a first pattern of one or more random access occasions that are available for a random access message transmission from the UE during a random access configuration period, means for receiving, during the random access configuration period, a second signal that indicates a second random access configuration that is an adaptation of the first random access configuration, the second random access configuration to be applied for a time duration that starts at a first time relative to a receipt time of the second signal, and means for transmitting at least a first random access message in a first random access occasion that is determined based on the second random access configuration.

A non-transitory computer-readable medium storing code for wireless communications is described. The code may include instructions executable by one or more processors to receive a first signal that indicates a first random access configuration including a first pattern of one or more random access occasions that are available for a random access message transmission from the UE during a random access configuration period, receive, during the random access configuration period, a second signal that indicates a second random access configuration that is an adaptation of the first random access configuration, the second random access configuration to be applied for a time duration that starts at a first time relative to a receipt time of the second signal, and transmit at least a first random access message in a first random access occasion that is determined based on the second random access configuration.

In some examples of the method, UEs, and non-transitory computer-readable medium described herein, the second random access configuration provides one or more additional random access occasions than initially provided in the first random access configuration.

In some examples of the method, UEs, and non-transitory computer-readable medium described herein, the receiving the second signal may include operations, features, means, or instructions for receiving one or more of a paging early indication, a paging downlink control information (DCI) transmission, a paging downlink shared channel transmission, or a DCI transmission that provides an updated pattern of random access occasions within the random access configuration period.

Some examples of the method, UEs, and non-transitory computer-readable medium described herein may further include operations, features, means, or instructions for applying the second random access configuration for one or more random access association pattern periods subsequent to a random access association pattern period in which the second signal is received. Some examples of the method, UEs, and non-transitory computer-readable medium described herein may further include operations, features, means, or instructions for applying the second random access configuration for one or more random access association periods subsequent to a random access association period in which the second signal is received. Some examples of the method, UEs, and non-transitory computer-readable medium described herein may further include operations, features, means, or instructions for applying the second random access configuration starting at a defined time duration subsequent to receipt of the second signal that indicates the second random access configuration. Some examples of the method, UEs, and non-transitory computer-readable medium described herein may further include operations, features, means, or instructions for applying the second random access configuration starting at a defined quantity of radio frames subsequent to a radio frame in which the second signal is received.

In some examples of the method, UEs, and non-transitory computer-readable medium described herein, the second random access configuration is applied until receipt of an updated system information block at the UE. In some examples of the method, UEs, and non-transitory computer-readable medium described herein, the second random access configuration is applied until receipt of another signal subsequent to the second signal that updates the first random access configuration at the UE. In some examples of the method, UEs, and non-transitory computer-readable medium described herein, the second random access configuration is applied for a defined time duration or quantity of radio frames subsequent to receipt of the second signal at the UE. In some examples of the method, UEs, and non-transitory computer-readable medium described herein, the second random access configuration is applied for a defined quantity of random access association pattern periods or random access association periods within a random access association pattern period.

In some examples of the method, UEs, and non-transitory computer-readable medium described herein, the second random access configuration is applied for a first time duration when an increased quantity of random access occasions is indicated, and is applied for a second time duration when a decreased quantity of random access occasions is indicated, and where the first time duration is different than the second time duration.

In some examples of the method, UEs, and non-transitory computer-readable medium described herein, the second signal provides an implicit indication or an explicit indication of the second random access configuration. In some examples of the method, UEs, and non-transitory computer-readable medium described herein, when the implicit indication of the second random access configuration is received, the second random access configuration is applied until a successful random access message transmission.

In some examples of the method, UEs, and non-transitory computer-readable medium described herein, the second signal provides an update to a random access occasion pattern for two or more random access association periods within a random access association pattern period. Some examples of the method, UEs, and non-transitory computer-readable medium described herein may further include operations, features, means, or instructions for initiating, based on the second signal, a timer associated with the second random access configuration and discontinuing application of the second random access configuration upon expiration of the timer. Some examples of the method, UEs, and non-transitory computer-readable medium described herein may further include operations, features, means, or instructions for activating the second random access configuration starting at a system information modification period subsequent when the second signal is received.

A method for wireless communications by a network entity is described. The method may include outputting a first signal that indicates a random access configuration including a first pattern of one or more random access occasions that are available for a random access message transmission from a UE during a random access configuration period, outputting, during the random access configuration period, a second signal that indicates a second random access configuration that is an adaptation of the first random access configuration, the second random access configuration to be applied for a time duration that starts at a first time relative to a receipt time of the second signal, and obtaining at least a first random access message from the UE in a first random access occasion that is determined based on the second random access configuration.

A network entity for wireless communications is described. The network entity may include one or more memories storing processor executable code, and one or more processors coupled with the one or more memories. The one or more processors may individually or collectively be operable to execute the code to cause the network entity to output a first signal that indicates a random access configuration including a first pattern of one or more random access occasions that are available for a random access message transmission from a UE during a random access configuration period, output, during the random access configuration period, a second signal that indicates a second random access configuration that is an adaptation of the first random access configuration, the second random access configuration to be applied for a time duration that starts at a first time relative to a receipt time of the second signal, and obtain at least a first random access message from the UE in a first random access occasion that is determined based on the second random access configuration.

Another network entity for wireless communications is described. The network entity may include means for outputting a first signal that indicates a random access configuration including a first pattern of one or more random access occasions that are available for a random access message transmission from a UE during a random access configuration period, means for outputting, during the random access configuration period, a second signal that indicates a second random access configuration that is an adaptation of the first random access configuration, the second random access configuration to be applied for a time duration that starts at a first time relative to a receipt time of the second signal, and means for obtaining at least a first random access message from the UE in a first random access occasion that is determined based on the second random access configuration.

A non-transitory computer-readable medium storing code for wireless communications is described. The code may include instructions executable by one or more processors to output a first signal that indicates a random access configuration including a first pattern of one or more random access occasions that are available for a random access message transmission from a UE during a random access configuration period, output, during the random access configuration period, a second signal that indicates a second random access configuration that is an adaptation of the first random access configuration, the second random access configuration to be applied for a time duration that starts at a first time relative to a receipt time of the second signal, and obtain at least a first random access message from the UE in a first random access occasion that is determined based on the second random access configuration.

In some examples of the method, network entities, and non-transitory computer-readable medium described herein, the second random access configuration provides one or more additional random access occasions than initially provided in the first random access configuration.

In some examples of the method, network entities, and non-transitory computer-readable medium described herein, the outputting the second signal may include operations, features, means, or instructions for outputting one or more of a paging early indication, a paging DCI transmission, a paging downlink shared channel transmission, or a DCI transmission that provides an updated pattern of random access occasions within the random access configuration period.

Some examples of the method, network entities, and non-transitory computer-readable medium described herein may further include operations, features, means, or instructions for applying the second random access configuration for one or more random access association pattern periods subsequent to a random access association pattern period in which the second signal is provided to the UE. Some examples of the method, network entities, and non-transitory computer-readable medium described herein may further include operations, features, means, or instructions for applying the second random access configuration for one or more random access association periods subsequent to a random access association period in which the second signal is provided to the UE. Some examples of the method, network entities, and non-transitory computer-readable medium described herein may further include operations, features, means, or instructions for applying the second random access configuration starting at a defined time duration subsequent to when the second signal is provided to the UE. Some examples of the method, network entities, and non-transitory computer-readable medium described herein may further include operations, features, means, or instructions for applying the second random access configuration starting at a defined quantity of radio frames subsequent to a radio frame in which the second signal is provided to the UE.

In some examples of the method, network entities, and non-transitory computer-readable medium described herein, the second random access configuration is applied until an updated system information block is provided to the UE. In some examples of the method, network entities, and non-transitory computer-readable medium described herein, the second random access configuration is applied until another signal that updates the first random access configuration is provided to the UE subsequent to the second signal. In some examples of the method, network entities, and non-transitory computer-readable medium described herein, the second random access configuration is applied for a defined time duration or quantity of radio frames subsequent to when the second signal is provided to the UE. In some examples of the method, network entities, and non-transitory computer-readable medium described herein, the second random access configuration is applied for a defined quantity of random access association pattern periods or random access association periods within a random access association pattern period. In some examples of the method, network entities, and non-transitory computer-readable medium described herein, the second random access configuration is applied for a first time duration when an increased quantity of random access occasions is indicated, and is applied for a second time duration when a decreased quantity of random access occasions is indicated, and where the first time duration is different than the second time duration.

In some examples of the method, network entities, and non-transitory computer-readable medium described herein, the second signal provides an implicit indication or an explicit indication of the second random access configuration. In some examples of the method, network entities, and non-transitory computer-readable medium described herein, when the implicit indication of the second random access configuration is provided, the second random access configuration is applied until a successful random access message transmission from the UE. In some examples of the method, network entities, and non-transitory computer-readable medium described herein, the second signal provides an update to a random access occasion pattern for two or more random access association periods within a random access association pattern period.

BRIEF DESCRIPTION OF THE DRAWINGS

FIGS. 15 through 20 show flowcharts illustrating methods that support techniques for adaptation of random access configuration in wireless communications in accordance with one or more aspects of the present disclosure.

DETAILED DESCRIPTION

Figure 1:
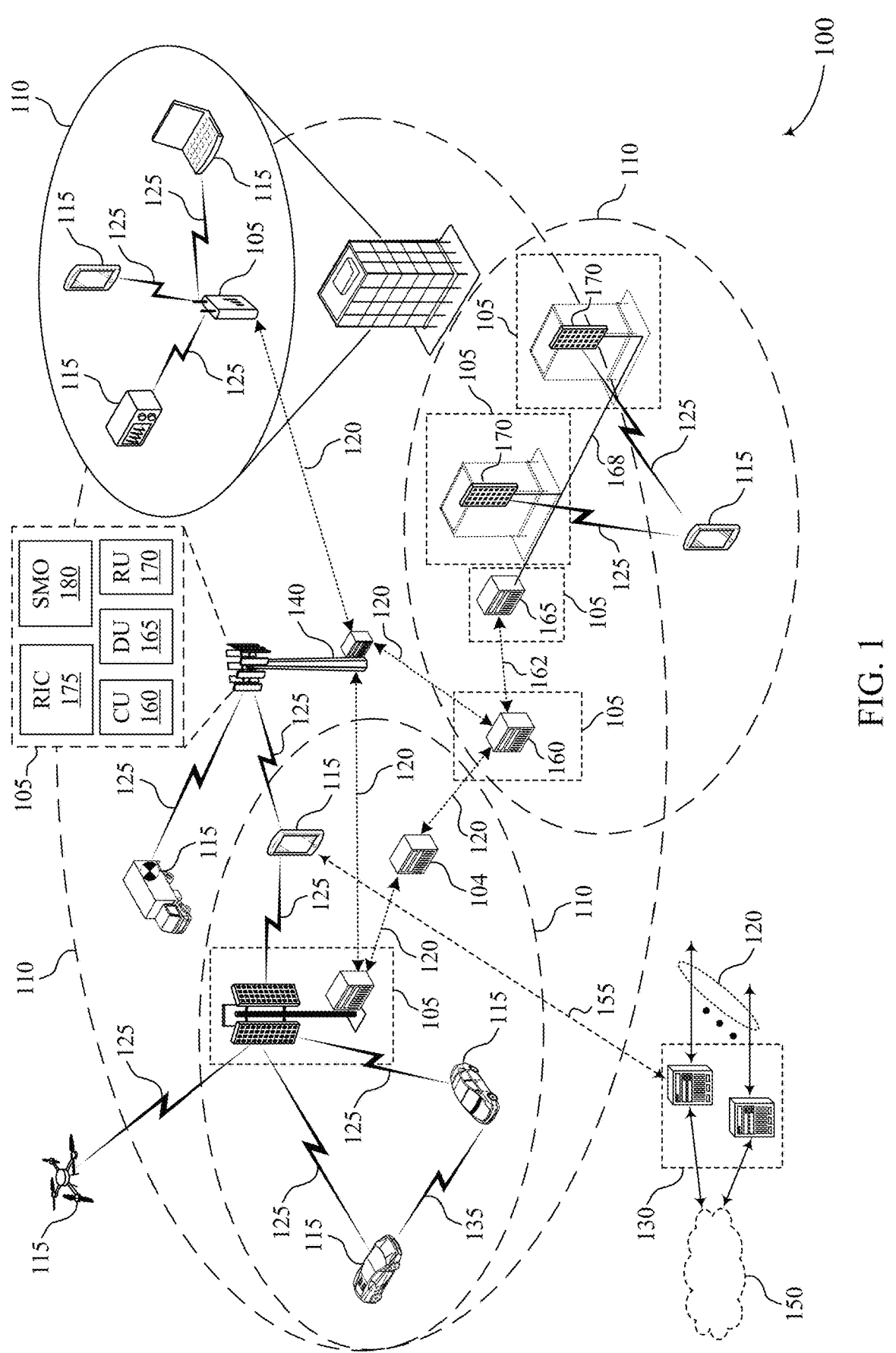
FIG. 1 shows an example of a wireless communications system that supports techniques for adaptation of random access configuration in wireless communications in accordance with one or more aspects of the present disclosure.

A wireless communications system may include a device, such as a user equipment (UE) or a network entity (e.g., an eNodeB (eNB), a next-generation NodeB or a giga-NodeB, either of which may be referred to as a gNB, or some other base station or network entity), that supports wireless communications using one or multiple radio access technologies. Examples of radio access technologies include 4G systems, such as LTE systems, 5G systems, which may be referred to as new radio (NR) systems, or other systems and radio technologies, including future systems and radio technologies not explicitly mentioned herein (e.g., sixth generation (6G) systems and beyond).

In some wireless communications systems, such as fifth generation (5G) or NR systems, a relatively large amount of power may be consumed by network components in some situations. For example, a network entity in a system that uses beamformed communications, such as a radio unit (RU) or a radio head, may transmit multiple directional beams in multiple directions. Such systems may provide information for use by a user equipment (UE) to access the wireless communications system (e.g., system information that provides parameters for system access) using beam sweeping techniques in which information is provided in multiple different transmissions in multiple different directions. The network entity may also monitor random access channel (RACH) occasions (ROs) for random access messages that are transmitted from UEs, where a RO pattern may include a number of ROs that are to be monitored, and where different ROs may be associated with different beams.

In some cases, in order to reduce network power consumption, a network entity may transition to a sleep mode or non-active mode in which some or all transmit and receive circuitry is powered down. For example, during off-peak times, there may be no traffic or a light traffic load in a cell, and the network entity may stop or reduce periodic transmissions (e.g., SSB and SI transmissions) and periodic monitoring (e.g., monitoring of ROs, and/or monitoring for configured grant uplink (CG) transmissions or small data transmission (SDT) communications), and transition to a non-active mode (e.g., in which periodic active periods may be used to monitor ROs). In some cases, it may be useful to temporarily increase the number of ROs available to a UE to transmit a random access message, such as when a UE is paged. Increasing a quantity of available ROs may allow for reduced latency by allowing the UE to transmit a RACH request sooner than in cases where a reduced number of ROs are available.

In current wireless communication systems, such as 5G systems, ROs and RO patterns may be configured in a physical random access channel (PRACH) configuration, that provide patterns of ROs within RACH association periods that are defined within a PRACH association pattern period. In order to change configured ROs in such systems, a new PRACH configuration may be provided to a UE, which can take time and overhead. Thus, efficient signaling of an adapted RO pattern that may be temporarily applied at a UE may be beneficial.

In accordance with various aspects, techniques are provided for adaptation of a PRACH configuration to change a quantity of ROs available for transmission of a random access message from a UE subsequent to receipt of an adaptation signal at the UE. In some aspects, a quantity of ROs may be increased for a time duration subsequent to the receipt of the adaptation signal at the UE, which may reduce a latency for UE access to a network entity in response to receiving the signal. In some aspects, signaling that indicates the adaptation of the PRACH configuration may provide an implicit indication such as may be provided by a paging message (e.g., in a paging early indicator (PEI), paging downlink control information (DCI), or paging physical downlink shared channel (PDSCH) transmission), or an explicit indication that provides an updated RO pattern (e.g., a new DCI that provides the updated RO pattern). The timing for starting the adapted PRACH configuration, in some aspects, may be at a start of a subsequent RO pattern within an association pattern period, at a start of a subsequent paging association pattern period, or a certain number of milliseconds or frames subsequent to the signaling that indicates the adapted RO pattern. In some aspects, the adapted RO pattern may be valid for the subsequent RO pattern within the paging association pattern period, the subsequent paging association pattern period, until an updated PRACH configuration is provided, or for a certain number of milliseconds or frames. In some cases, a new DCI may indicate an updated pattern of ROs within a PRACH association pattern period.

Aspects of the disclosure are initially described in the context of wireless communications systems. Aspects of the disclosure are further illustrated by and described with reference to resource diagrams of ROs, process flows, apparatus diagrams, system diagrams, and flowcharts that relate to techniques for adaptation of random access configuration in wireless communications.

FIG. 1 shows an example of a wireless communications system 100 that supports techniques for adaptation of random access configuration in wireless communications in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, UEs 115 may be provided a PRACH configuration that indicates a pattern of ROs that are available for transmission of RACH messages. In accordance with various aspects, techniques are described that provide for adaptation of a PRACH configuration to change a quantity of ROs available for transmission of a RACH message from a UE 115 subsequent to receipt of an adaptation signal at the UE 115. In some aspects, a quantity of ROs may be increased for a time duration subsequent to the receipt of the adaptation signal at the UE 115, which may reduce a latency for UE access to a network entity in response to receiving the signal.

Figure 2:
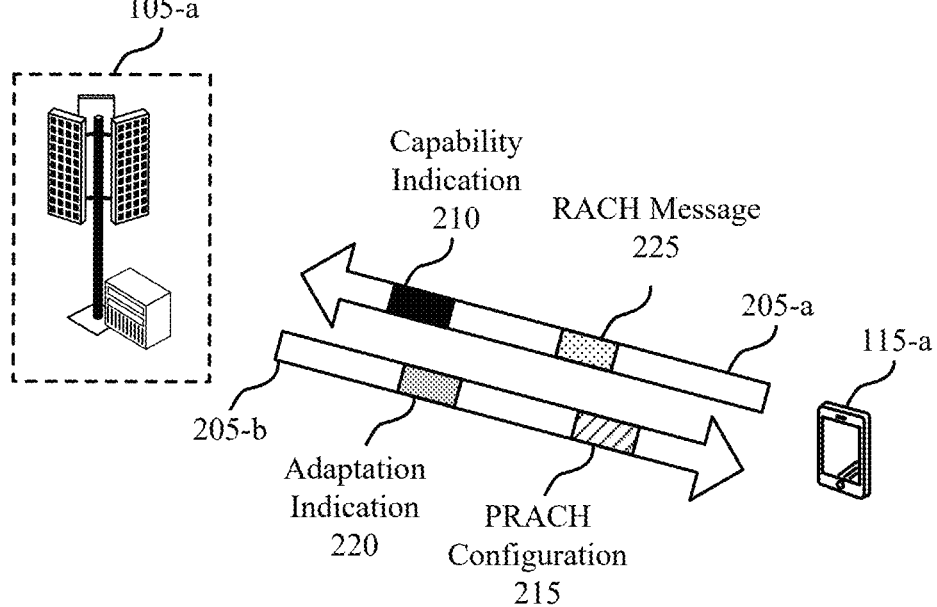
FIG. 2 shows an example of a wireless communications system that supports techniques for adaptation of random access configuration in wireless communications in accordance with one or more aspects of the present disclosure.

FIG. 2 shows an example of a wireless communications system 200 that supports techniques for adaptation of random access configuration in wireless communications in accordance with one or more aspects of the present disclosure. The wireless communications system 200 may implement or be implemented by aspects of the wireless communications system 100 as described herein with reference to FIG. 1. For example, the wireless communications system 200 may include a UE 115-*a* and a network entity 105-*a*, which may be an example of UEs 115 and network entities 105 as described herein with reference to FIG. 1. The wireless communications system 200 may support 3G, 4G, 5G, or radio access technologies beyond 5G.

The UE 115-*a* and the network entity 105-*a* may perform wireless communication (e.g., one or more of receiving, obtaining, transmitting, or outputting one or more of control information, configuration information, or data) via a communication link 205, including uplink communication link 205-*a* and downlink communication link 205-*b*, which may be examples of communications links 125 as described herein with reference to FIG. 1. In some cases, communication link 205 may include multiple component carriers. In the example of FIG. 2, the UE 115-*a* may be capable of adapting a PRACH configuration and associated RO pattern based on a signal received from the network entity 105-a. In such examples, the UE 115-a may transmit a capability indication 210 to the network entity 105-a that indicates the capability of adapting the PRACH configuration. For example, the capability indication 210 may indicate that the UE 115-a can identify changed ROs for random access messages based on a signal that is received at the UE 115-a.

In some aspects, the network entity 105-a may transmit a PRACH configuration 215 to the UE 115-a, where the PRACH configuration 215 indicates subframes that include ROs in accordance with a RO pattern. In the example of FIG. 2, the network entity 105-a may transmit an adaptation indication 220 to the UE 115-a, which may indicate that the PRACH configuration 215 is to be updated to include a different quantity of ROs. For example, the PRACH configuration 215 may be adapted or changed from a first PRACH configuration with a first quantity of ROs to a second PRACH configuration with a second quantity of ROs. The UE 115-a may transmit RACH message 225 using one or more of the ROs associated with the adapted PRACH configuration.

In some aspects, a quantity of ROs may be increased for a time duration subsequent to the receipt of the adaptation indication 220 at the UE 115-a, which may reduce a latency for UE 115-a access to the network entity 105-a in response to receiving the signal. In some aspects, the adaptation indication 220 may be an implicit indication that may be provided, for example, by paging message (e.g., in a PEI, a paging DCI, or a paging PDSCH transmission), or an explicit indication that provides an updated RO pattern (e.g., a DCI that provides the updated RO pattern). In some aspects, the timing for starting the adapted PRACH configuration may be at a start of a PRACH association pattern period that follows the PRACH association pattern period in which the adaptation indication 220 is received, at a start of a subsequent PRACH association period following the PRACH association period in which the adaptation indication 220 is received, a certain time duration subsequent to the receipt of the adaptation indication 220 (e.g., X milliseconds from a first symbol of the adaptation indication 220), or a certain quantity of frames subsequent to the receipt of the adaptation indication 220 (e.g., X frames from a frame in which the adaptation indication 220 is received). In some aspects, the UE 115-a may initiate a timer associated with the adapted PRACH configuration based on receiving the adaptation indication 220 (or within a specific time offset from receiving the adaptation indication 220), and may discontinue application of the adapted PRACH configuration upon expiration of the timer. In some cases, the timer may have a timer value that is configured at the UE 115-a (e.g., by RRC signaling). In some aspects, the UE 115-a may activate the adapted PRACH configuration starting at a system information modification period (e.g., that is configured by SIB1 via modificationPeriodCoeff) subsequent to when the adaptation indication 220 is received. In some aspects, the adapted PRACH configuration and associated RO pattern may be valid until an updated PRACH configuration is provided (e.g., in an updated system information block (SIB)), until the UE 115-a receives another indication updating the PRACH configuration (e.g., another adaptation indication 220), for a certain time duration from the start of the updated PRACH configuration (e.g., X milliseconds from a first symbol of the updated PRACH configuration), or for certain quantity of frames (e.g., X frames, after which the UE 115-a reverts to the initially provided PRACH configuration 215).

In some aspects, the adaptation indication 220 may indicate either an increase in the ROs or a decrease in the ROs. In some cases, the timeline for how long this adaptation will be valid for may depend on the adaptation itself. For example, adding extra ROs may be valid for two frames but removing ROs may be valid for one frame (e.g., because it will have more impact on latency). In some aspects, if the UE 115-a receives an adaptation indication 220 that increases a quantity of ROs in the adapted PRACH configuration, the UE 115-a may consider this indication to valid for X frames, and if the UE 115-a receives an adaptation indication 220 decreasing the quantity of ROs in the adapted PRACH configuration, the UE 115-a may consider this indication to be valid for Y frames, where X may be greater than or equal to Y. In other aspects, in cases where an implicit indication provides the adaptation indication 220 (e.g., a paging indication that increases the quantity of ROs) or in cases where the adaptation indication 220 also triggers the UE 115-a to transmit RACH message 225, the adaptation may be valid until the UE 115-a successfully transmits RACH message 225 (e.g., until a response is received that indicates RACH message 225 was successfully received at the network entity 105-a.

Figure 3:
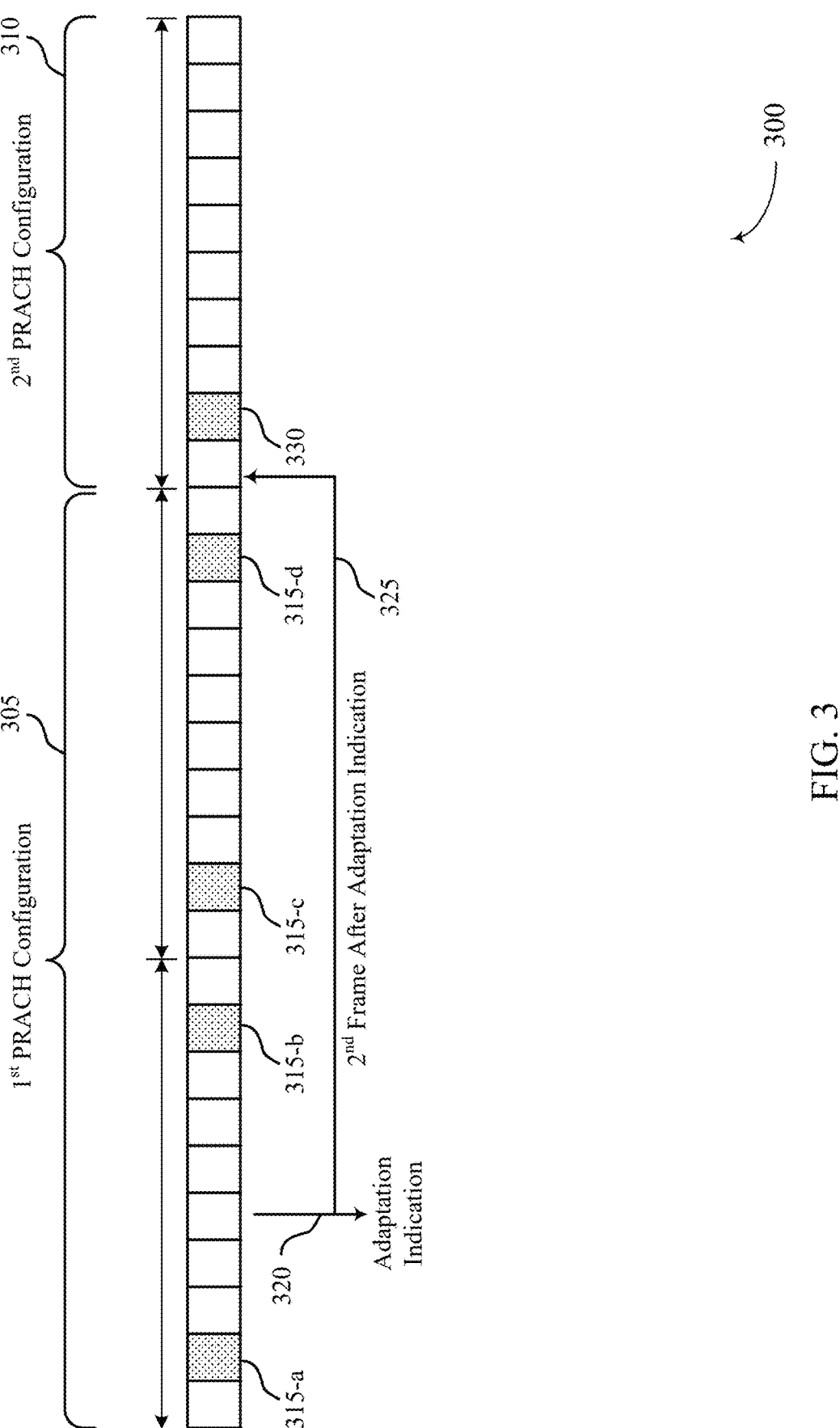
FIG. 3 shows an example of a random access occasion (RO) pattern that supports techniques for adaptation of random access configuration in wireless communications in accordance with one or more aspects of the present disclosure.
Figure 4:
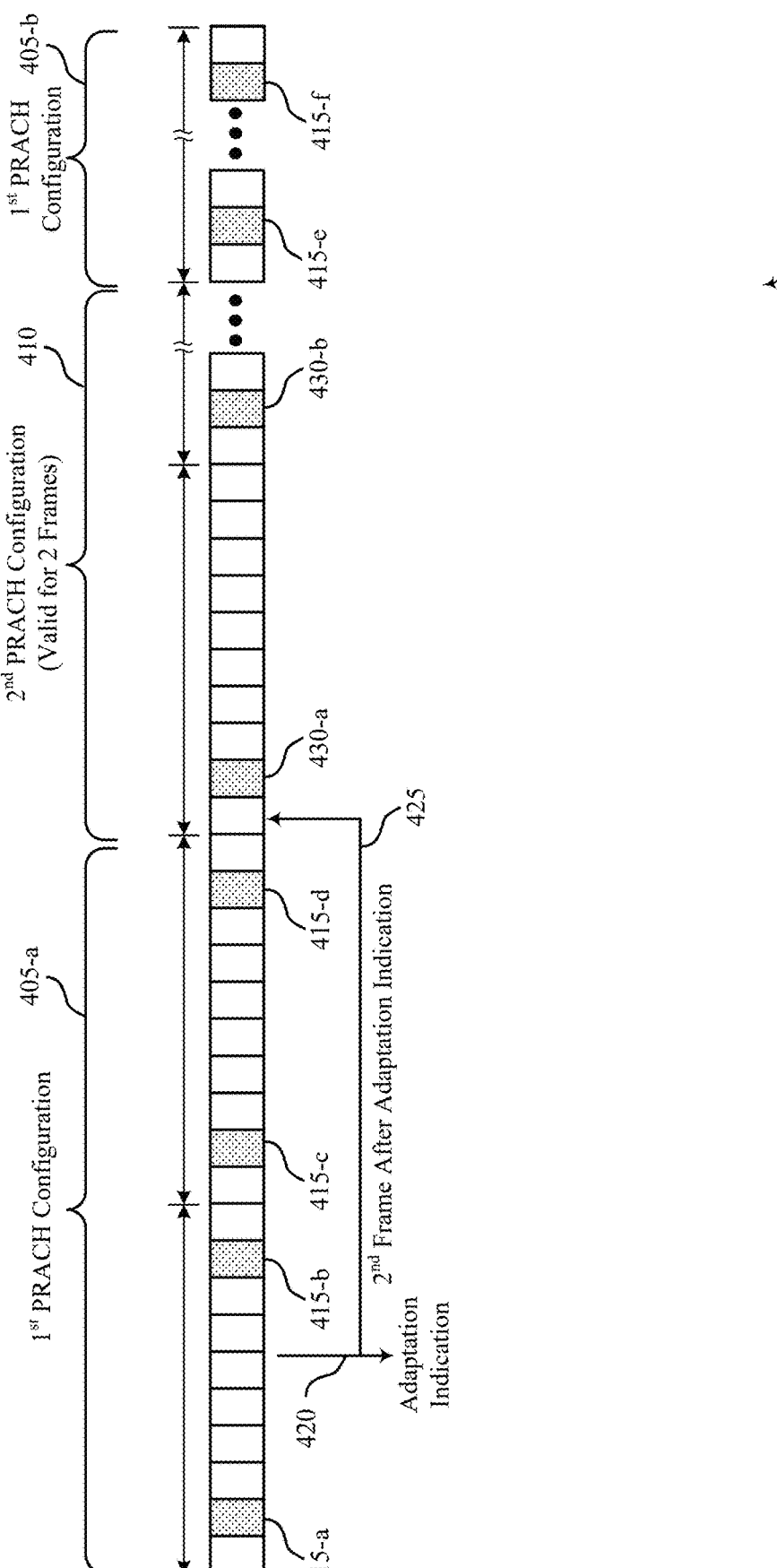
FIG. 4 shows an example of a RO pattern that supports techniques for adaptation of random access configuration in wireless communications in accordance with one or more aspects of the present disclosure.
Figure 5:
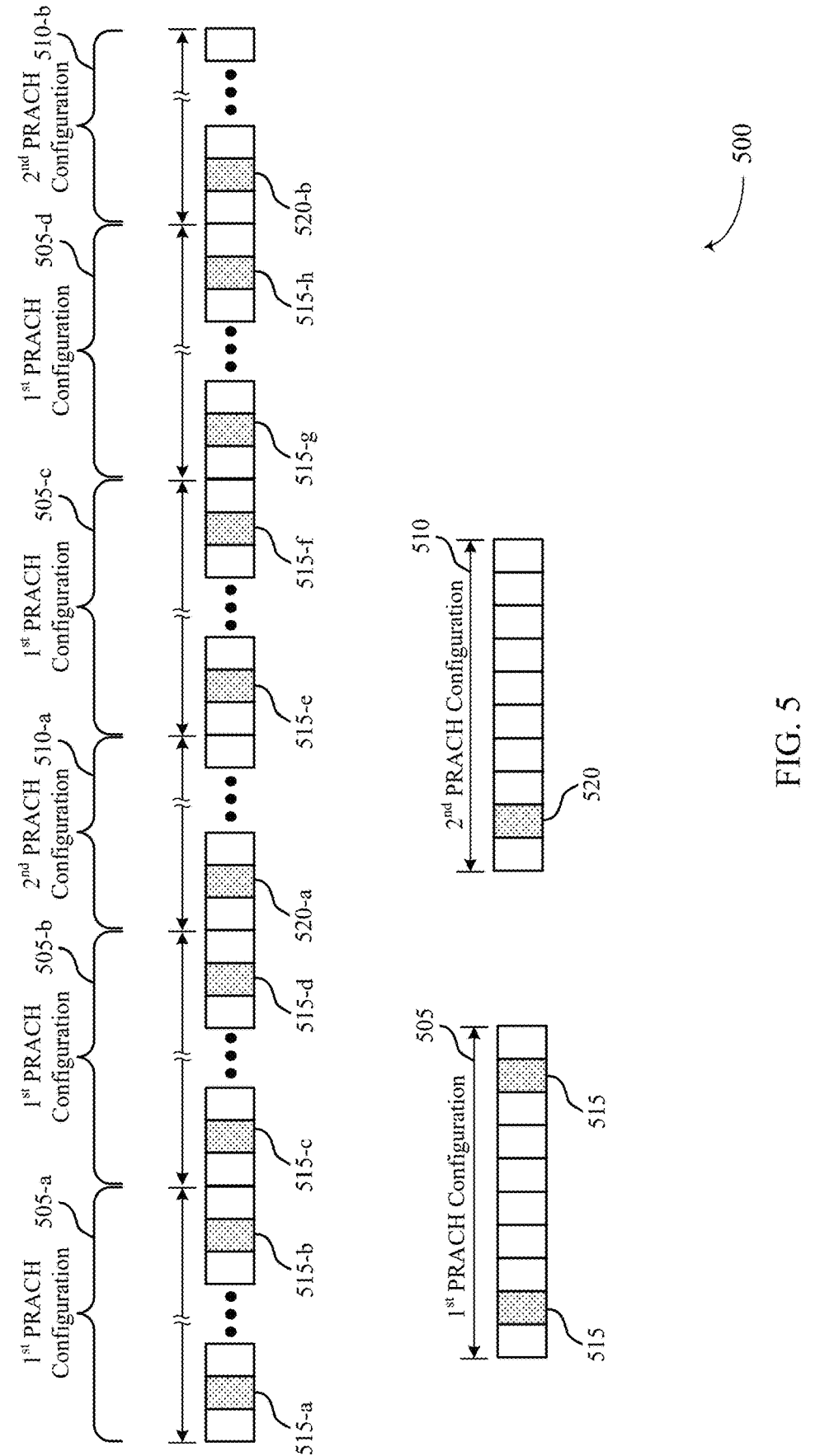
FIG. 5 shows an example of a RO pattern that supports techniques for adaptation of random access configuration in wireless communications in accordance with one or more aspects of the present disclosure.

Additionally, or alternatively, in some aspects a PRACH configuration may be semi-statically adapted. For example, implicit PRACH adaptation may be semi-static such that the adapted PRACH configuration is applied until a subsequent signal is received at the UE 115-a that further updated the PRACH configuration. In some aspects, the network entity 105-a may define a periodic switching between two or more configurations. For example, a PRACH configuration 215 may be provided that indicates two different PRACH configurations, and the adaptation indication 220 may indicate a change in which PRACH configuration is used, or indicate a change in a pattern between the two PRACH configuration. For example, a pattern for switching between the two PRACH configurations may be indicated at a bitmap for a set of frames that indicates which configuration is to be used (e.g., a 001001 indication for which 0 means follow legacy configuration and 1 means use the second configuration, etc.), or may indicate value that is mapped to which configuration is to be used for which frames. FIGS. 3 through 5 provide examples of RO patterns in accordance with various aspects of techniques discussed herein.

FIG. 3 shows an example of a RO pattern 300 that supports techniques for adaptation of random access configuration in wireless communications in accordance with one or more aspects of the present disclosure. In some cases, aspects of the RO pattern 300 may implement or be implemented by aspects of a wireless communications system 100 or 200, as described with reference to FIGS. 1 and 2. For example, the RO pattern 300 may be configured at network entity 105 and a UE 115, which may be examples of a network entity 105 and UE 115 as described with reference to FIGS. 1 and 2.

In this example, a first PRACH configuration 305 may be configured at a UE and a network entity, which may be adapted to a second PRACH configuration 310 by an adaptation indication. In this example, the first PRACH configuration 305 may include ROs 315 where each radio frame includes two ROs 315 such that two consecutive radio frames include a first RO 315-a, a second RO 315-b, a third RO 315-c, and a fourth RO 315-d. Further, in this example, the second PRACH configuration 310 includes one RO 330 per radio frame, and thus the second PRACH configuration 310 provides fewer ROs than the first PRACH configuration 305. In other examples, as will be readily understood, the second PRACH configuration 310 may include more ROs 330 than the first PRACH configuration 305. In the example, of FIG. 3, an adaptation indication 320 may be received during a first radio frame, and a timeline 325 for initiating the second PRACH configuration 310 may be a second frame after receipt of the adaptation indication 320. In some cases, the timeline 325 for updating the PRACH configuration may be configured at the UE (e.g., via RRC signaling), or may be a defined timeline for UEs that are capable of performing such PRACH adaptation. As discussed herein, in some aspects the second PRACH configuration 310 may be valid for a defined time duration (e.g., a certain quantity of radio frames or milliseconds, after which the first PRACH configuration 305 is resumed, such as illustrated in the example of FIG. 4), or until a subsequent signal is received that further updates the PRACH configuration.

FIG. 4 shows another example of a RO pattern 400 that supports techniques for adaptation of random access configuration in wireless communications in accordance with one or more aspects of the present disclosure. In some cases, aspects of the RO pattern 400 may implement or be implemented by aspects of a wireless communications system 100 or 200, as described with reference to FIGS. 1 and 2. For example, the RO pattern 400 may be configured at network entity 105 and a UE 115, which may be examples of a network entity 105 and UE 115 as described with reference to FIGS. 1 and 2.

In this example, a first PRACH configuration 405 may be configured at a UE and a network entity, which may be adapted to a second PRACH configuration 410 by an adaptation indication. In this example, the first PRACH configuration 405 may include ROs 415 where each radio frame includes two ROs 415 such that an initial two consecutive radio frames include a first RO 415-*a*, a second RO 415-*b*, a third RO 415-*c*, and a fourth RO 415-*d*, and a fifth radio frame subsequent to the second PRACH configuration 410 includes a fifth RO 415-*e* and a sixth RO 415-*f*. Further, in this example, the second PRACH configuration 410 includes one RO 430 per radio frame, and thus the second PRACH configuration 410 provides a first RO 430-*a* in a third radio frame and a second RO 430-*b* in a fourth radio frame. In other examples, as will be readily understood, the second PRACH configuration 410 may include more ROs 430 than the first PRACH configuration 405. In the example, of FIG. 4, an adaptation indication 420 may be received during a first radio frame, and a timeline 425 for initiating the second PRACH configuration 410 may be a second frame after receipt of the adaptation indication 420. In this example, the second PRACH configuration 410 may be valid for two radio frames, and thus in this example a first instance of the first PRACH configuration 405-*a* may apply for the first and second radio frames, the second PRACH configuration 410 may apply for the third and fourth radio frames, and a second instance of the first PRACH configuration 405-*b* may apply for a fifth and subsequent radio frames.

FIG. 5 shows another example of a RO pattern 500 that supports techniques for adaptation of random access configuration in wireless communications in accordance with one or more aspects of the present disclosure. In some cases, aspects of the RO pattern 500 may implement or be implemented by aspects of a wireless communications system 100 or 200, as described with reference to FIGS. 1 and 2. For example, the RO pattern 500 may be configured at network entity 105 and a UE 115, which may be examples of a network entity 105 and UE 115 as described with reference to FIGS. 1 and 2.

In this example, a pattern of PRACH configurations may be provided that includes a first PRACH configuration 505 and a second PRACH configuration 510. In some cases, an adaptation indication (e.g., a DCI that indicates which configuration is to be used for which radio frames) may be provided that indicates which PRACH configuration is to be used for each frame of a set of radio frames. For example, the adaptation indication may indicate pattern that applies to a set of consecutive radio frames, such as six radio frames in this example. The pattern may indicate that the first PRACH configuration 505 applies to a first, second, fourth, and fifth radio frame, where the first PRACH configuration 505 provides two ROs 515 per frame. Further, in this example, the pattern may indicate that the second PRACH configuration 510 applies to a third and sixth radio frame, where the second PRACH configuration 510 provides one RO 520 per frame. The patten may be indicated by a network entity such as by using a sequence that indicates the configuration pattern for the set of frames (e.g., a 112112 sequence value), by using a bitmap that indicates which configuration applies to each frame of the set of frames (e.g., a 001001 bitmap that indicates a configured or adapted PRACH configuration applies), or by using an index value that is mapped to a pattern (e.g., a two bit index value where each bit value is mapped to a different sequence of PRACH configurations for the set of frames). Such examples are described for purposes of illustration and discussion only, and numerous other examples of patterns and pattern indications are available in accordance with techniques discussed herein.

Continuing with the example of FIG. 5, a first instance of the first PRACH configuration 505-*a* may apply to a first frame that includes a first RO 515-*a* and a second RO 515-*b*. A second instance of the first PRACH configuration 505-*b* may apply to a second frame that includes a third RO 515-*c* and a fourth RO 515-*d*. A first instance of the second PRACH configuration 510-*a* may apply to a third frame that includes a first RO 520-*a* of the second PRACH configuration 510-*a*. A third instance of the first PRACH configuration 505-*c* may apply to a fourth that includes a fifth RO 515-*e* and a sixth RO 515-*f*, and a fourth instance of the first PRACH configuration 505-*d* may apply to a sixth frame that includes a seventh RO 515-*g* and an eighth RO 515-*h*. Finally, in this example, a second instance of the second PRACH configuration 510-*b* may apply to a sixth frame that includes a second RO 520-*b* of the second PRACH configuration 510-*b*. In such a manner, a quantity of ROs available for RACH messages may be selected to provide for efficient transmission of RACH messages and provide a latency for such RACH messages that is appropriate for the type of communications between the UE and the network entity.

Figure 6:
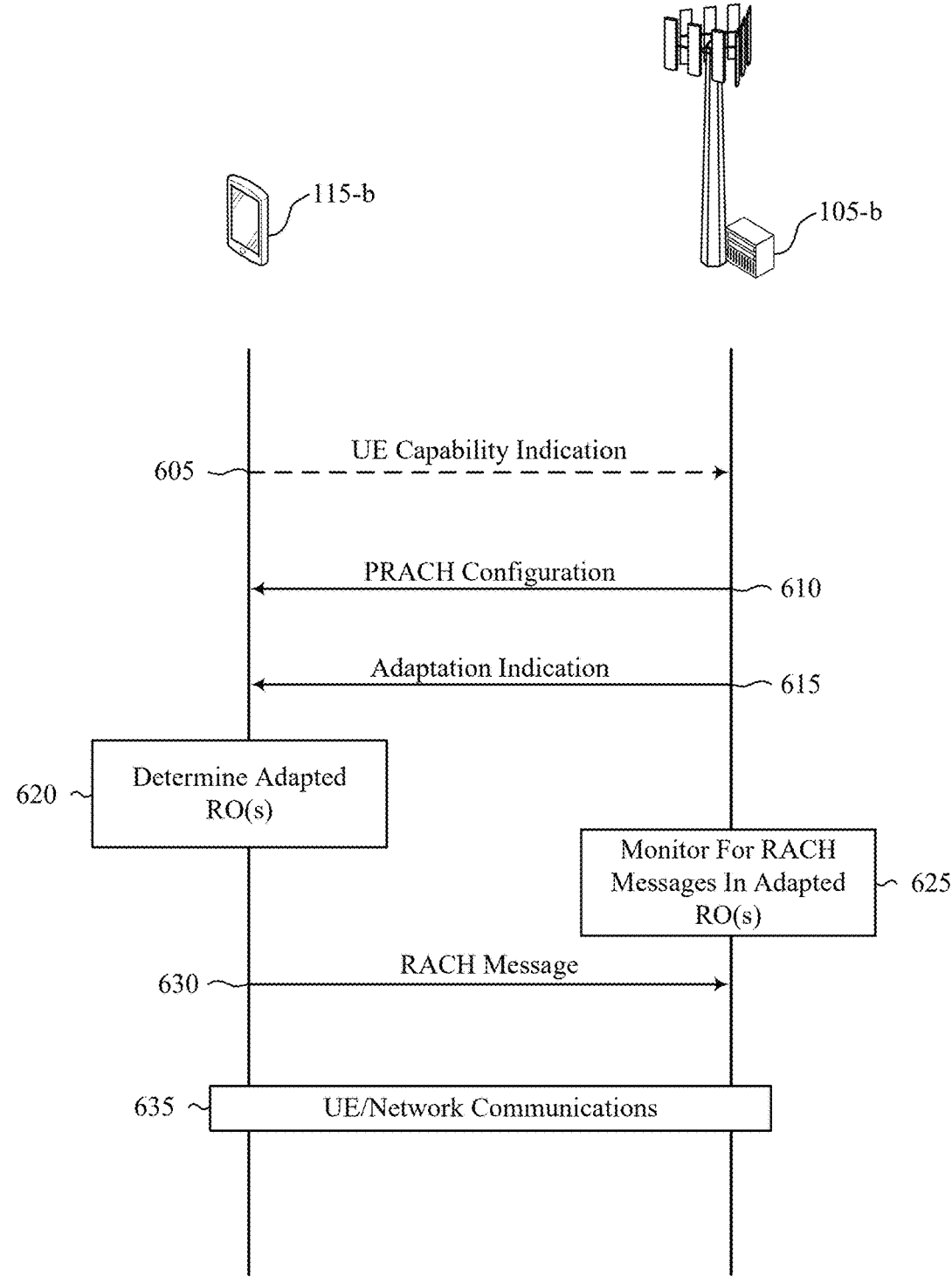
FIG. 6 shows an example of a process flow that supports techniques for adaptation of random access configuration in wireless communications in accordance with one or more aspects of the present disclosure.

FIG. 6 shows an example of a process flow 600 that supports techniques for adaptation of random access configuration in wireless communications in accordance with one or more aspects of the present disclosure. In some cases, aspects of the process flow 600 may implement or be implemented by aspects of a wireless communications system 100 or 200, or random access resource, as described with reference to FIGS. 1 through 5. For example, the process flow 600 may include a UE 115-*b*, which may be an example of a UE 115 as described with reference to FIGS. 1 through 5. Additionally, the process flow 600 may include a network entity 105-*b*, which may be an example of a network entity 105 as described with reference to FIGS. 1 through 5.

In the following description of the process flow 600, the operations may be performed in a different order than the order shown. Additionally, or alternatively, other operations may be added or removed from the process flow 600. Although the UE 115-b, and the network entity 105-b are shown performing the operations of the process flow 600, some aspects of some operations may be performed by one or more other devices (e.g., other UEs 115, other network entities 105, or other entities external to the network).

At 605, optionally, the UE 115-b may transmit, and the network entity 105-b may receive, a UE capability indication. In some cases, the UE capability indication may be provided via RRC signaling with other UE 115-b capabilities. In some cases, the UE capability indication may be provided in response to a query from the network entity 105-b. In some cases, the UE capability indication may indicate that the UE 115-b can identify and adapt PRACH configurations and ROs for random access messages, in accordance with techniques as discussed herein.

At 610, the network entity 105-b may transmit, and the UE 115-b may receive, a PRACH configuration. In some cases, the PRACH configuration may indicate a PRACH configuration index value that is mapped to parameters that define locations of ROs.

At 615, the network entity 105-b may transmit, and the UE 115-b may receive, an adaptation indication. In some cases, the adaptation indication may indicate that a different PRACH configuration is to be used for RACH messages between the UE 115-b and the network entity 105-b. In some cases, the adaptation indication may be provided in a paging message that implicitly indicates that the PRACH configuration is to be adapted to provide additional ROs compared to the previously provided PRACH configuration. In other cases, the adaptation indication may be an explicit indication provided in a DCI communication that indicates a specific PRACH configuration, or a pattern of PRACH configurations that are to be applied to a series of radio frames.

At 620, the UE 115-b may determine resources for one or more adapted ROS based on the PRACH configuration and the adaptation indication. The UE 115-b may determine the adapted RO location(s) in one or more radio frames in accordance with various techniques as discussed herein, including determination of time/frequency resources for one or more ROs. At 625, the network entity 105-b may monitor for RACH messages in one or more ROs in accordance with the adapted RO location(s).

At 630, the UE 115-b may transmit, and the network entity 105-b may receive, a RACH message (e.g., MSG1) in a RO that is available in accordance with the adapted PRACH configuration. At 635, the UE 115-b and network entity 105-b may communicate using established communications procedures that are triggered by the RACH message.

Figure 7:
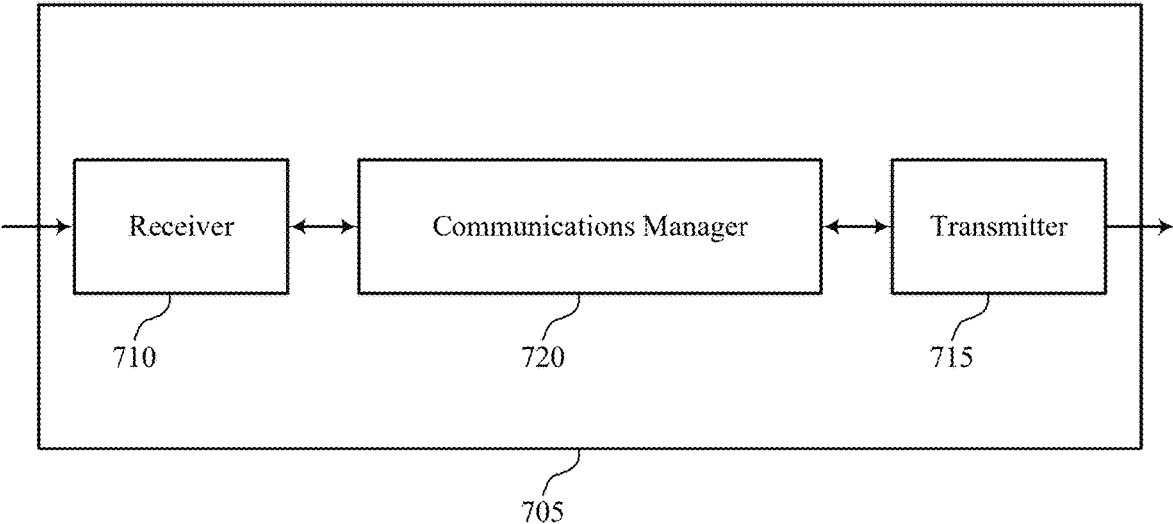
FIGS. 7 and 8 show block diagrams of devices that support techniques for adaptation of random access configuration in wireless communications in accordance with one or more aspects of the present disclosure.

FIG. 7 shows a block diagram 700 of a device 705 that supports techniques for adaptation of random access configuration in wireless communications in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for adaptation of random access configuration in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for adaptation of random access configuration in wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of techniques for adaptation of random access configuration in wireless communications as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving a first signal that indicates a first random access configuration including a first pattern of one or more ROs that are available for a random access message transmission from the UE during a random access configuration period. The communications manager 720 is capable of, configured to, or operable to support a means for receiving, during the random access configuration period, a second signal that indicates a second random access configuration that is an adaptation of the first random access configuration, the second random access configuration to be applied for a time duration that starts at a first time relative to a receipt time of the second signal. The communications manager 720 is capable of, configured to, or operable to support a means for transmitting at least a first random access message in a first RO that is determined based on the second random access configuration.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for adaptation of a PRACH configuration that may provide for more efficient utilization of communication resources, and reduced latency associated with random access messages and related network access.

Figure 8:
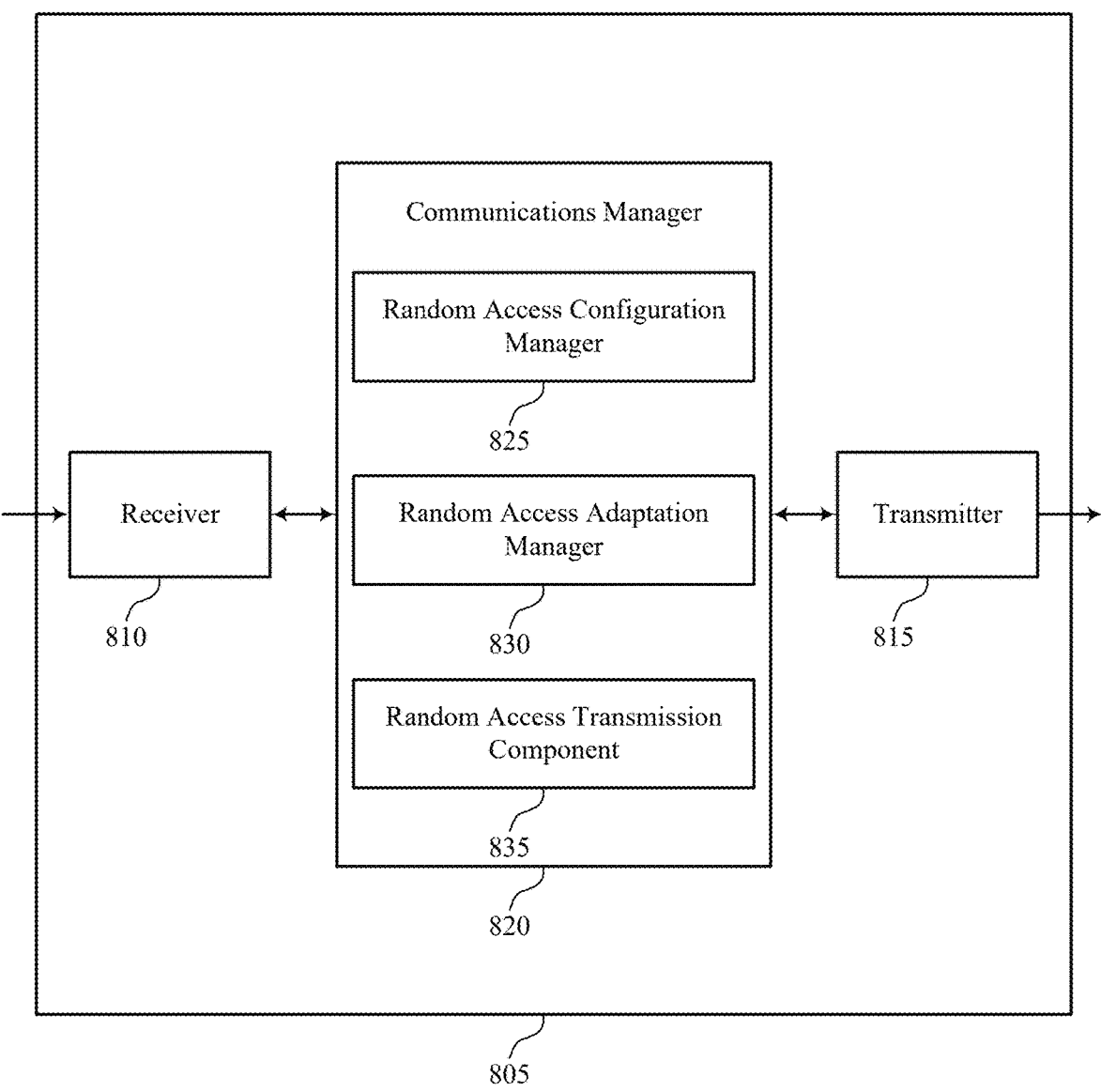

FIG. 8 shows a block diagram 800 of a device 805 that supports techniques for adaptation of random access configuration in wireless communications in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for adaptation of random access configuration in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for adaptation of random access configuration in wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for adaptation of random access configuration in wireless communications as described herein. For example, the communications manager 820 may include a random access configuration manager 825, a random access adaptation manager 830, a random access transmission component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The random access configuration manager 825 is capable of, configured to, or operable to support a means for receiving a first signal that indicates a first random access configuration including a first pattern of one or more ROs that are available for a random access message transmission from the UE during a random access configuration period. The random access adaptation manager 830 is capable of, configured to, or operable to support a means for receiving, during the random access configuration period, a second signal that indicates a second random access configuration that is an adaptation of the first random access configuration, the second random access configuration to be applied for a time duration that starts at a first time relative to a receipt time of the second signal. The random access transmission component 835 is capable of, configured to, or operable to support a means for transmitting at least a first random access message in a first RO that is determined based on the second random access configuration.

Figure 9:
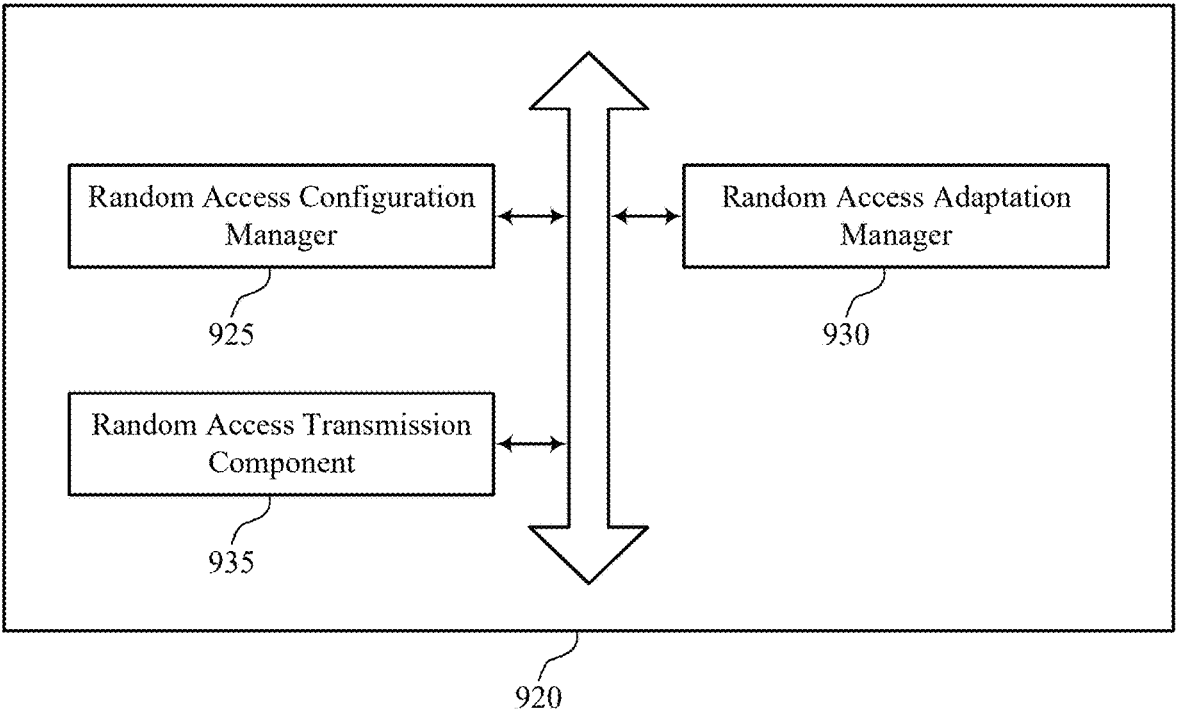
FIG. 9 shows a block diagram of a communications manager that supports techniques for adaptation of random access configuration in wireless communications in accordance with one or more aspects of the present disclosure.

FIG. 9 shows a block diagram 900 of a communications manager 920 that supports techniques for adaptation of random access configuration in wireless communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for adaptation of random access configuration in wireless communications as described herein. For example, the communications manager 920 may include a random access configuration manager 925, a random access adaptation manager 930, a random access transmission component 935, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The random access configuration manager 925 is capable of, configured to, or operable to support a means for receiving a first signal that indicates a first random access configuration including a first pattern of one or more ROs that are available for a random access message transmission from the UE during a random access configuration period. The random access adaptation manager 930 is capable of, configured to, or operable to support a means for receiving, during the random access configuration period, a second signal that indicates a second random access configuration that is an adaptation of the first random access configuration, the second random access configuration to be applied for a time duration that starts at a first time relative to a receipt time of the second signal. The random access transmission component 935 is capable of, configured to, or operable to support a means for transmitting at least a first random access message in a first RO that is determined based on the second random access configuration. In some examples, the second random access configuration provides one or more additional ROs than initially provided in the first random access configuration.

In some examples, to support receiving the second signal, the random access adaptation manager 930 is capable of, configured to, or operable to support a means for receiving one or more of a paging early indication, a paging DCI transmission, a paging downlink shared channel transmission, or a DCI transmission that provides an updated pattern of ROs within the random access configuration period. In some examples, the random access adaptation manager 930 is capable of, configured to, or operable to support a means for applying the second random access configuration for one or more random access association pattern periods subsequent to a random access association pattern period in which the second signal is received.

In some examples, the random access adaptation manager 930 is capable of, configured to, or operable to support a means for applying the second random access configuration for one or more random access association periods subsequent to a random access association period in which the second signal is received. In some examples, the random access adaptation manager 930 is capable of, configured to, or operable to support a means for applying the second random access configuration starting at a defined time duration subsequent to receipt of the second signal that indicates the second random access configuration. In some examples, the random access adaptation manager 930 is capable of, configured to, or operable to support a means for applying the second random access configuration starting at a defined quantity of radio frames subsequent to a radio frame in which the second signal is received.

In some examples, the second random access configuration is applied until receipt of an updated system information block at the UE. In some examples, the second random access configuration is applied until receipt of another signal subsequent to the second signal that updates the first random access configuration at the UE. In some examples, the second random access configuration is applied for a defined time duration or quantity of radio frames subsequent to receipt of the second signal at the UE. In some examples, the second random access configuration is applied for a defined quantity of random access association pattern periods or random access association periods within a random access association pattern period. In some examples, the second random access configuration is applied for a first time duration when an increased quantity of ROs is indicated, and is applied for a second time duration when a decreased quantity of ROs is indicated, and where the first time duration is different than the second time duration.

In some examples, the second signal provides an implicit indication or an explicit indication of the second random access configuration. In some examples, when the implicit indication of the second random access configuration is received, the second random access configuration is applied until a successful random access message transmission. In some examples, the second signal provides an update to a RO pattern for two or more random access association periods within a random access association pattern period.

Figure 10:
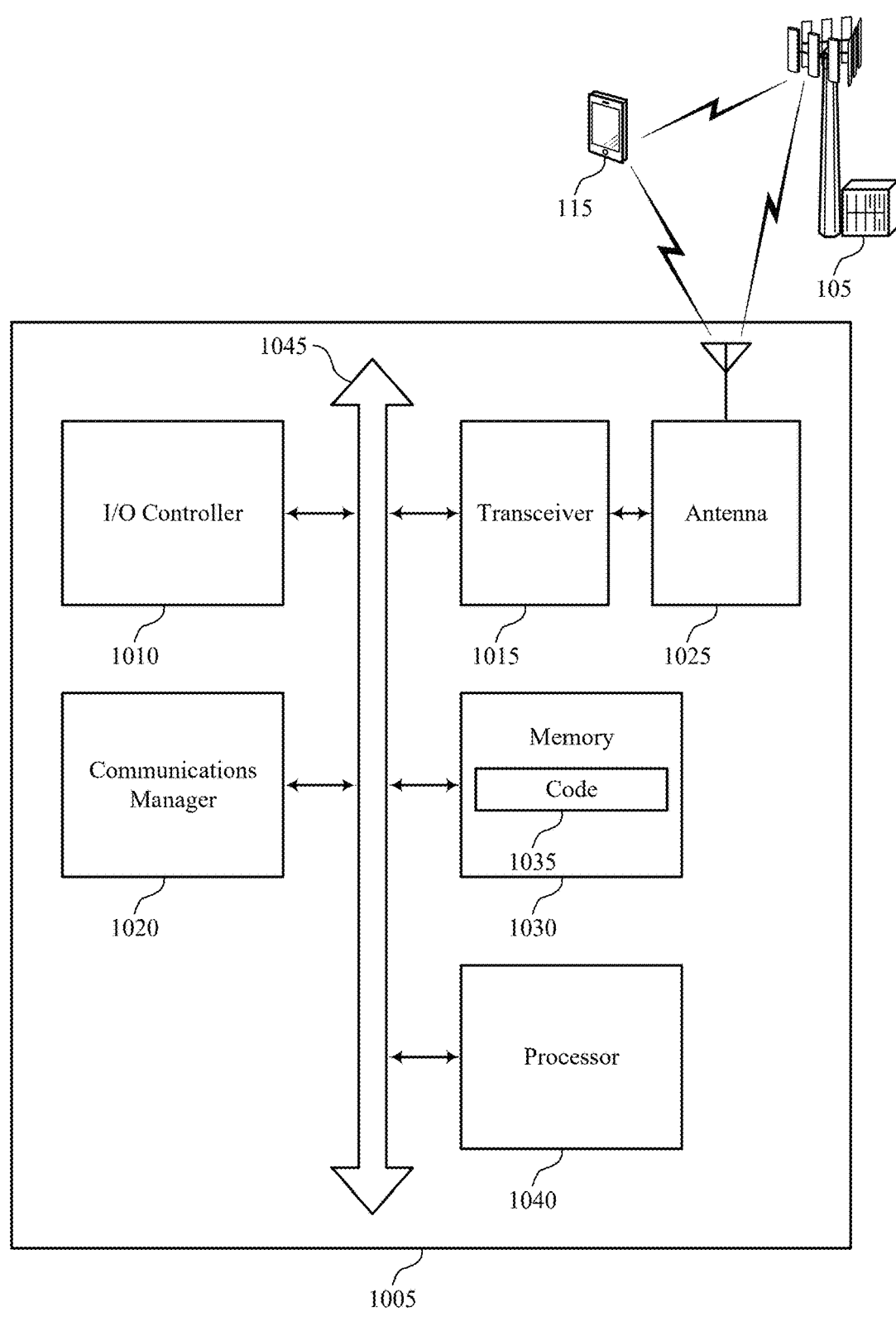
FIG. 10 shows a diagram of a system including a device that supports techniques for adaptation of random access configuration in wireless communications in accordance with one or more aspects of the present disclosure.

FIG. 10 shows a diagram of a system 1000 including a device 1005 that supports techniques for adaptation of random access configuration in wireless communications in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WIN-DOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting techniques for adaptation of random access configuration in wireless communications). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving a first signal that indicates a first random access configuration including a first pattern of one or more ROs that are available for a random access message transmission from the UE during a random access configuration period. The communications manager 1020 is capable of, configured to, or operable to support a means for receiving, during the random access configuration period, a second signal that indicates a second random access configuration that is an adaptation of the first random access configuration, the second random access configuration to be applied for a time duration that starts at a first time relative to a receipt time of the second signal. The communications manager 1020 is capable of, configured to, or operable to support a means for transmitting at least a first random access message in a first RO that is determined based on the second random access configuration.

By including or configuring the communications manager 1020 in accordance with examples as described herein, the device 1005 may support techniques for adaptation of a PRACH configuration that may provide for more efficient utilization of communication resources, improved communication reliability, and reduced latency associated with random access messages and related network access.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of techniques for adaptation of random access configuration in wireless communications as described herein, or the at least one processor 1040 and the at least one memory 1030 may be otherwise configured to, individually or collectively, perform or support such operations.

Figure 11:
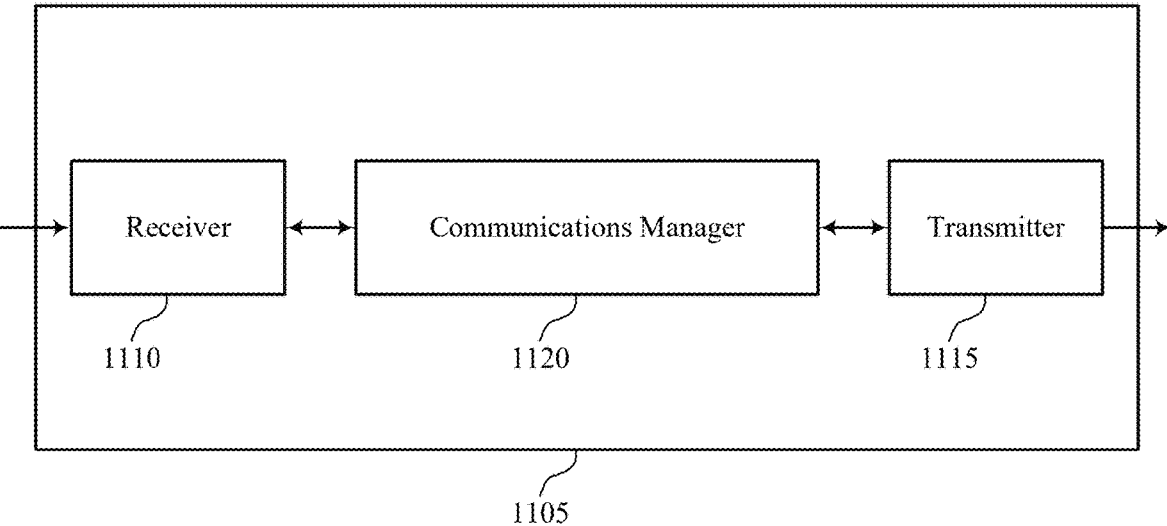
FIGS. 11 and 12 show block diagrams of devices that support techniques for adaptation of random access configuration in wireless communications in accordance with one or more aspects of the present disclosure.

FIG. 11 shows a block diagram 1100 of a device 1105 that supports techniques for adaptation of random access configuration in wireless communications in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations or components thereof may be examples of means for performing various aspects of techniques for adaptation of random access configuration in wireless communications as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter

1115, or both to obtain information, output information, or perform various other operations as described herein.

The communications manager 1120 may support wireless communications in accordance with examples as disclosed herein. For example, the communications manager 1120 is capable of, configured to, or operable to support a means for outputting a first signal that indicates a random access configuration including a first pattern of one or more ROs that are available for a random access message transmission from a UE during a random access configuration period. The communications manager 1120 is capable of, configured to, or operable to support a means for outputting, during the random access configuration period, a second signal that indicates a second random access configuration that is an adaptation of the first random access configuration, the second random access configuration to be applied for a time duration that starts at a first time relative to a receipt time of the second signal. The communications manager 1120 is capable of, configured to, or operable to support a means for obtaining at least a first random access message from the UE in a first RO that is determined based on the second random access configuration.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for adaptation of a PRACH configuration that may provide for more efficient utilization of communication resources, and reduced latency associated with random access messages and related network access.

Figure 12:
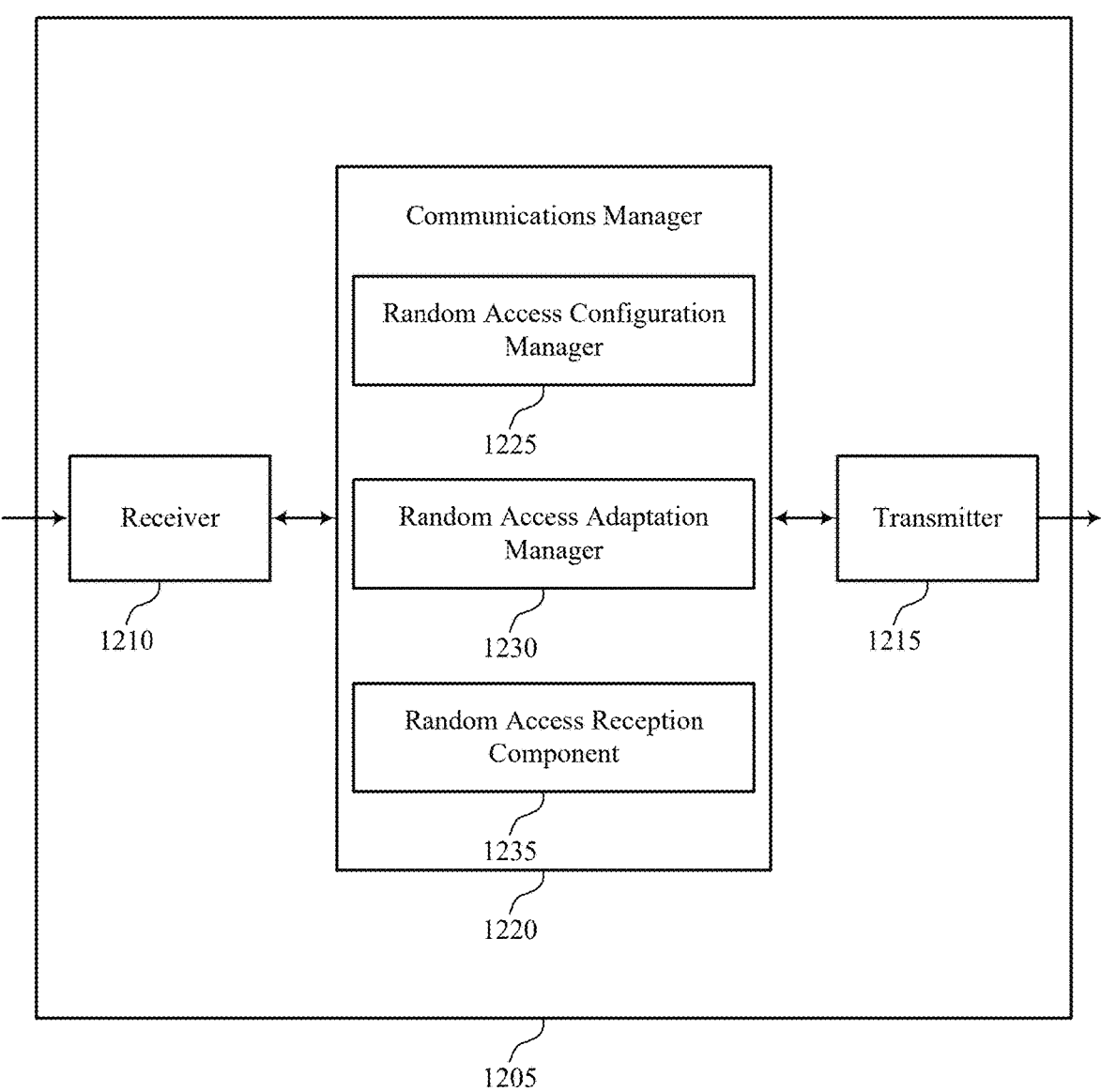

FIG. 12 shows a block diagram 1200 of a device 1205 that supports techniques for adaptation of random access configuration in wireless communications in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for adaptation of random access configuration in wireless communications as described herein. For example, the communications manager 1220 may include a random access configuration manager 1225, a random access adaptation manager 1230, a random access reception component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The random access configuration manager 1225 is capable of, configured to, or operable to support a means for outputting a first signal that indicates a random access configuration including a first pattern of one or more ROs that are available for a random access message transmission from a UE during a random access configuration period. The random access adaptation manager 1230 is capable of, configured to, or operable to support a means for outputting, during the random access configuration period, a second signal that indicates a second random access configuration that is an adaptation of the first random access configuration, the second random access configuration to be applied for a time duration that starts at a first time relative to a receipt time of the second signal. The random access reception component 1235 is capable of, configured to, or operable to support a means for obtaining at least a first random access message from the UE in a first RO that is determined based on the second random access configuration.

Figure 13:
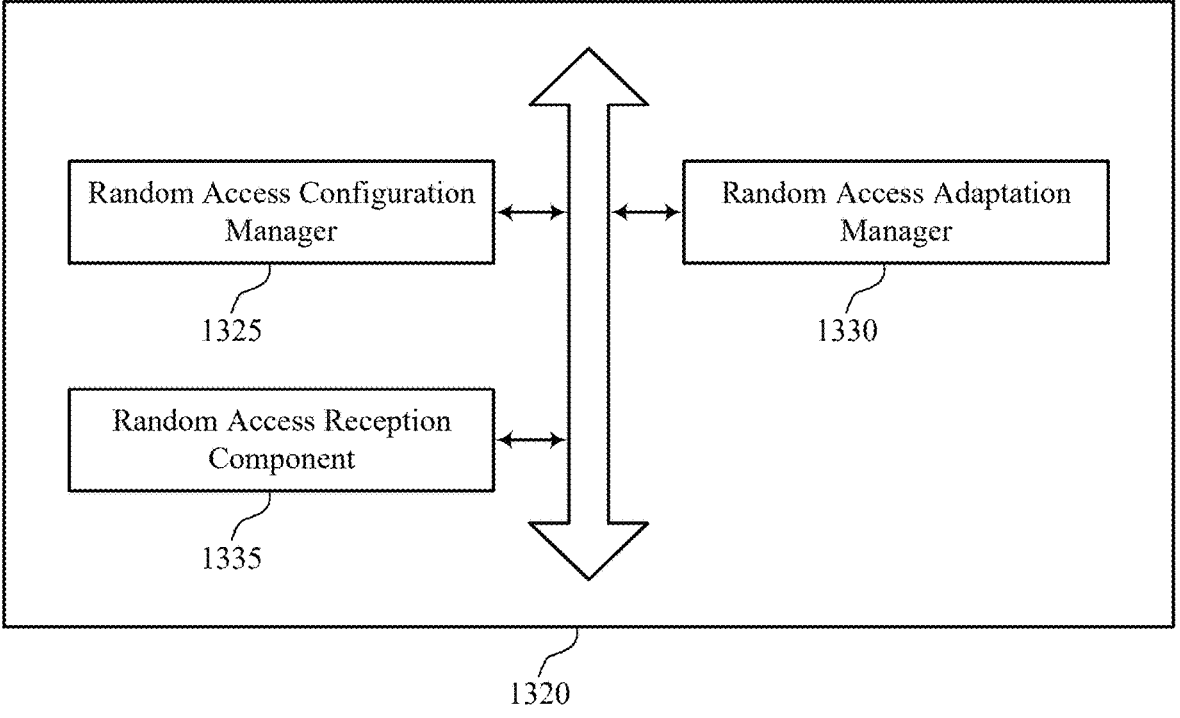
FIG. 13 shows a block diagram of a communications manager that supports techniques for adaptation of random access configuration in wireless communications in accordance with one or more aspects of the present disclosure.

FIG. 13 shows a block diagram 1300 of a communications manager 1320 that supports techniques for adaptation of random access configuration in wireless communications in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for adaptation of random access configuration in wireless communications as described herein. For example, the communications manager 1320 may include a random access configuration manager 1325, a random access adaptation manager 1330, a random access reception component 1335, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The random access configuration manager 1325 is capable of, configured to, or operable to support a means for outputting a first signal that indicates a random access configuration including a first pattern of one or more ROs that are available for a random access message transmission from a UE during a random access configuration period. The random access adaptation manager 1330 is capable of, configured to, or operable to support a means for outputting, during the random access configuration period, a second signal that indicates a second random access configuration that is an adaptation of the first random access configuration, the second random access configuration to be applied for a time duration that starts at a first time relative to a receipt time of the second signal. The random access reception component 1335 is capable of, configured to, or operable to support a means for obtaining at least a first random access message from the UE in a first RO that is determined based on the second random access configuration. In some examples, the second random access configuration provides one or more additional ROs than initially provided in the first random access configuration.

In some examples, to support outputting the second signal, the random access adaptation manager 1330 is capable of, configured to, or operable to support a means for outputting one or more of a paging early indication, a paging DCI transmission, a paging downlink shared channel transmission, or a DCI transmission that provides an updated pattern of ROs within the random access configuration period. In some examples, the random access adaptation manager 1330 is capable of, configured to, or operable to support a means for applying the second random access configuration for one or more random access association pattern periods subsequent to a random access association pattern period in which the second signal is provided to the UE.

In some examples, the random access adaptation manager 1330 is capable of, configured to, or operable to support a means for applying the second random access configuration for one or more random access association periods subsequent to a random access association period in which the second signal is provided to the UE. In some examples, the random access adaptation manager 1330 is capable of, configured to, or operable to support a means for applying the second random access configuration starting at a defined time duration subsequent to when the second signal is provided to the UE. In some examples, the random access adaptation manager 1330 is capable of, configured to, or operable to support a means for applying the second random access configuration starting at a defined quantity of radio frames subsequent to a radio frame in which the second signal is provided to the UE.

In some examples, the second random access configuration is applied until an updated system information block is provided to the UE. In some examples, the second random access configuration is applied until another signal that updates the first random access configuration is provided to the UE subsequent to the second signal. In some examples, the second random access configuration is applied for a defined time duration or quantity of radio frames subsequent to when the second signal is provided to the UE. In some examples, the second random access configuration is applied for a defined quantity of random access association pattern periods or random access association periods within a random access association pattern period.

In some examples, the second random access configuration is applied for a first time duration when an increased quantity of ROs is indicated, and is applied for a second time duration when a decreased quantity of ROs is indicated, and where the first time duration is different than the second time duration. In some examples, the second signal provides an implicit indication or an explicit indication of the second random access configuration. In some examples, when the implicit indication of the second random access configuration is provided, the second random access configuration is applied until a successful random access message transmission from the UE. In some examples, the second signal provides an update to a RO pattern for two or more random access association periods within a random access association pattern period.

Figure 14:
FIG. 14 shows a diagram of a system including a device that supports techniques for adaptation of random access configuration in wireless communications in accordance with one or more aspects of the present disclosure.

FIG. 14 shows a diagram of a system 1400 including a device 1405 that supports techniques for adaptation of random access configuration in wireless communications in accordance with one or more aspects of the present disclosure. The device 1405 may be an example of or include components of a device 1105, a device 1205, or a network entity 105 as described herein. The device 1405 may communicate with other network devices or network equipment such as one or more of the network entities 105, UEs 115, or any combination thereof. The communications may include communications over one or more wired interfaces, over one or more wireless interfaces, or any combination thereof. The device 1405 may include components that support outputting and obtaining communications, such as a communications manager 1420, a transceiver 1410, one or more antennas 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., communication link(s) 125, backhaul communication link(s) 120, a midhaul communication link 162, a fronthaul communication link 168).

The at least one memory 1425 may include RAM, ROM, or any combination thereof. The at least one memory 1425 may store computer-readable, computer-executable, or processor-executable code, such as the code 1430. The code 1430 may include instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may include, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting techniques for adaptation of random access configuration in wireless communications). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425).

In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with one or more other network entities 105, and may include a controller or scheduler for controlling communications with UEs 115 (e.g., in cooperation with the one or more other network devices). In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for outputting a first signal that indicates a random access configuration including a first pattern of one or more ROs that are available for a random access message transmission from a UE during a random access configuration period. The communications manager 1420 is capable of, configured to, or operable to support a means for outputting, during the random access configuration period, a second signal that indicates a second random access configuration that is an adaptation of the first random access configuration, the second random access configuration to be applied for a time duration that starts at a first time relative to a receipt time of the second signal. The communications manager 1420 is capable of, configured to, or operable to support a means for obtaining at least a first random access message from the UE in a first RO that is determined based on the second random access configuration.

By including or configuring the communications manager 1420 in accordance with examples as described herein, the device 1405 may support techniques for adaptation of a PRACH configuration that may provide for more efficient utilization of communication resources, improved user experience, and reduced latency associated with random access messages and related network access.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of techniques for adaptation of random access configuration in wireless communications as described herein, or the at least one processor 1435 and the at least one memory 1425 may be otherwise configured to, individually or collectively, perform or support such operations.

FIG. 15 shows a flowchart illustrating a method 1500 that supports techniques for adaptation of random access configuration in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a first signal that indicates a first random access configuration including a first pattern of one or more ROs that are available for a random access message transmission from the UE during a random access configuration period. The operations of 1505 may be performed in accordance with examples as disclosed herein. In some examples, aspects of the operations of 1505 may be performed by a random access configuration manager 925 as described with reference to FIG. 9.

At 1510, the method may include receiving, during the random access configuration period, a second signal that indicates a second random access configuration that is an adaptation of the first random access configuration, the second random access configuration to be applied for a time duration that starts at a first time relative to a receipt time of the second signal. The operations of 1510 may be performed in accordance with examples as disclosed herein. In some examples, aspects of the operations of 1510 may be performed by a random access adaptation manager 930 as described with reference to FIG. 9.

At 1515, the method may include transmitting at least a first random access message in a first RO that is determined based on the second random access configuration. The operations of 1515 may be performed in accordance with examples as disclosed herein. In some examples, aspects of the operations of 1515 may be performed by a random access transmission component 935 as described with reference to FIG. 9.

FIG. 16 shows a flowchart illustrating a method 1600 that supports techniques for adaptation of random access configuration in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a first signal that indicates a first random access configuration including a first pattern of one or more ROs that are available for a random access message transmission from the UE during a random access configuration period. The operations of 1605 may be performed in accordance with examples as disclosed herein. In some examples, aspects of the operations of 1605 may be performed by a random access configuration manager 925 as described with reference to FIG. 9.

At 1610, the method may include receiving, during the random access configuration period, a second signal that indicates a second random access configuration that is an adaptation of the first random access configuration, the second random access configuration to be applied for a time duration that starts at a first time relative to a receipt time of the second signal. The operations of 1610 may be performed in accordance with examples as disclosed herein. In some examples, aspects of the operations of 1610 may be performed by a random access adaptation manager 930 as described with reference to FIG. 9.

At 1615, the method may include receiving one or more of a paging early indication, a paging DCI transmission, a paging downlink shared channel transmission, or a DCI transmission that provides an updated pattern of ROs within the random access configuration period. The operations of 1615 may be performed in accordance with examples as disclosed herein. In some examples, aspects of the operations of 1615 may be performed by a random access adaptation manager 930 as described with reference to FIG. 9.

At 1620, the method may include transmitting at least a first random access message in a first RO that is determined based on the second random access configuration. The operations of 1620 may be performed in accordance with examples as disclosed herein. In some examples, aspects of the operations of 1620 may be performed by a random access transmission component 935 as described with reference to FIG. 9.

FIG. 17 shows a flowchart illustrating a method 1700 that supports techniques for adaptation of random access configuration in wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a first signal that indicates a first random access configuration including a first pattern of one or more ROs that are available for a random access message transmission from the UE during a random access configuration period. The operations of 1705 may be performed in accordance with examples as disclosed herein. In some examples, aspects of the operations of 1705 may be performed by a random access configuration manager 925 as described with reference to FIG. 9.

At 1710, the method may include receiving, during the random access configuration period, a second signal that indicates a second random access configuration that is an adaptation of the first random access configuration, the second random access configuration to be applied for a time duration that starts at a first time relative to a receipt time of the second signal. The operations of 1710 may be performed in accordance with examples as disclosed herein. In some examples, aspects of the operations of 1710 may be performed by a random access adaptation manager 930 as described with reference to FIG. 9.

At 1715, the method may include applying the second random access configuration for one or more random access association pattern periods subsequent to a random access association pattern period in which the second signal is received. The operations of 1715 may be performed in accordance with examples as disclosed herein. In some examples, aspects of the operations of 1715 may be performed by a random access adaptation manager 930 as described with reference to FIG. 9.

At 1720, the method may include transmitting at least a first random access message in a first RO that is determined based on the second random access configuration. The operations of 1720 may be performed in accordance with examples as disclosed herein. In some examples, aspects of the operations of 1720 may be performed by a random access transmission component 935 as described with reference to FIG. 9.

FIG. 18 shows a flowchart illustrating a method 1800 that supports techniques for adaptation of random access configuration in wireless communications in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include outputting a first signal that indicates a random access configuration including a first pattern of one or more ROs that are available for a random access message transmission from a UE during a random access configuration period. The operations of 1805 may be performed in accordance with examples as disclosed herein. In some examples, aspects of the operations of 1805 may be performed by a random access configuration manager 1325 as described with reference to FIG. 13.

At 1810, the method may include outputting, during the random access configuration period, a second signal that indicates a second random access configuration that is an adaptation of the first random access configuration, the second random access configuration to be applied for a time duration that starts at a first time relative to a receipt time of the second signal. The operations of 1810 may be performed in accordance with examples as disclosed herein. In some examples, aspects of the operations of 1810 may be performed by a random access adaptation manager 1330 as described with reference to FIG. 13.

At 1815, the method may include obtaining at least a first random access message from the UE in a first RO that is determined based on the second random access configuration. The operations of 1815 may be performed in accordance with examples as disclosed herein. In some examples, aspects of the operations of 1815 may be performed by a random access reception component 1335 as described with reference to FIG. 13.

FIG. 19 shows a flowchart illustrating a method 1900 that supports techniques for adaptation of random access configuration in wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include outputting a first signal that indicates a random access configuration including a first pattern of one or more ROs that are available for a random access message transmission from a UE during a random access configuration period. The operations of 1905 may be performed in accordance with examples as disclosed herein. In some examples, aspects of the operations of 1905 may be performed by a random access configuration manager 1325 as described with reference to FIG. 13.

At 1910, the method may include outputting, during the random access configuration period, a second signal that indicates a second random access configuration that is an adaptation of the first random access configuration, the second random access configuration to be applied for a time duration that starts at a first time relative to a receipt time of the second signal. The operations of 1910 may be performed in accordance with examples as disclosed herein. In some examples, aspects of the operations of 1910 may be performed by a random access adaptation manager 1330 as described with reference to FIG. 13.

At 1915, the method may include outputting one or more of a paging early indication, a paging DCI transmission, a paging downlink shared channel transmission, or a DCI transmission that provides an updated pattern of ROs within the random access configuration period. The operations of 1915 may be performed in accordance with examples as disclosed herein. In some examples, aspects of the operations of 1915 may be performed by a random access adaptation manager 1330 as described with reference to FIG. 13.

At 1920, the method may include obtaining at least a first random access message from the UE in a first RO that is determined based on the second random access configuration. The operations of 1920 may be performed in accordance with examples as disclosed herein. In some examples, aspects of the operations of 1920 may be performed by a random access reception component 1335 as described with reference to FIG. 13.

FIG. 20 shows a flowchart illustrating a method 2000 that supports techniques for adaptation of random access configuration in wireless communications in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include outputting a first signal that indicates a random access configuration including a first pattern of one or more ROs that are available for a random access message transmission from a UE during a random access configuration period. The operations of 2005 may be performed in accordance with examples as disclosed herein. In some examples, aspects of the operations of 2005 may be performed by a random access configuration manager 1325 as described with reference to FIG. 13.

At 2010, the method may include outputting, during the random access configuration period, a second signal that indicates a second random access configuration that is an adaptation of the first random access configuration, the second random access configuration to be applied for a time duration that starts at a first time relative to a receipt time of the second signal. The operations of 2010 may be performed in accordance with examples as disclosed herein. In some examples, aspects of the operations of 2010 may be performed by a random access adaptation manager 1330 as described with reference to FIG. 13.

At 2015, the method may include applying the second random access configuration for one or more random access association periods subsequent to a random access association period in which the second signal is provided to the UE. The operations of 2015 may be performed in accordance with examples as disclosed herein. In some examples, aspects of the operations of 2015 may be performed by a random access adaptation manager 1330 as described with reference to FIG. 13.

At 2020, the method may include obtaining at least a first random access message from the UE in a first RO that is determined based on the second random access configuration. The operations of 2020 may be performed in accordance with examples as disclosed herein. In some examples, aspects of the operations of 2020 may be performed by a random access reception component 1335 as described with reference to FIG. 13.

The following provides an overview of aspects of the present disclosure:

Aspect 1: A method for wireless communications at a UE, comprising: receiving a first signal that indicates a first random access configuration including a first pattern of one or more random access occasions that are available for a random access message transmission from the UE during a random access configuration period; receiving, during the random access configuration period, a second signal that indicates a second random access configuration that is an adaptation of the first random access configuration, the second random access configuration to be applied for a time duration that starts at a first time relative to a receipt time of the second signal; and transmitting at least a first random access message in a first random access occasion that is determined based at least in part on the second random access configuration.

Aspect 2: The method of aspect 1, wherein the second random access configuration provides one or more additional random access occasions than initially provided in the first random access configuration.

Aspect 3: The method of any of aspects 1 through 2, wherein the receiving the second signal comprises: receiving one or more of a paging early indication, a paging DCI transmission, a paging downlink shared channel transmission, or a DCI transmission that provides an updated pattern of random access occasions within the random access configuration period.

Aspect 4: The method of any of aspects 1 through 3, further comprising: applying the second random access configuration for one or more random access association pattern periods subsequent to a random access association pattern period in which the second signal is received.

Aspect 5: The method of any of aspects 1 through 4, further comprising: applying the second random access configuration for one or more random access association periods subsequent to a random access association period in which the second signal is received.

Aspect 6: The method of any of aspects 1 through 5, further comprising: applying the second random access configuration starting at a defined time duration subsequent to receipt of the second signal that indicates the second random access configuration.

Aspect 7: The method of any of aspects 1 through 6, further comprising: applying the second random access configuration starting at a defined quantity of radio frames subsequent to a radio frame in which the second signal is received.

Aspect 8: The method of any of aspects 1 through 7, wherein the second random access configuration is applied until receipt of an updated system information block at the UE.

Aspect 9: The method of any of aspects 1 through 8, wherein the second random access configuration is applied until receipt of another signal subsequent to the second signal that updates the first random access configuration at the UE.

Aspect 10: The method of any of aspects 1 through 9, wherein the second random access configuration is applied for a defined time duration or quantity of radio frames subsequent to receipt of the second signal at the UE.

Aspect 11: The method of any of aspects 1 through 10, wherein the second random access configuration is applied for a defined quantity of random access association pattern periods or random access association periods within a random access association pattern period.

Aspect 12: The method of any of aspects 1 through 11, wherein the second random access configuration is applied for a first time duration when an increased quantity of random access occasions is indicated, and is applied for a second time duration when a decreased quantity of random access occasions is indicated, and wherein the first time duration is different than the second time duration.

Aspect 13: The method of any of aspects 1 through 12, wherein the second signal provides an implicit indication or an explicit indication of the second random access configuration.

Aspect 14: The method of aspect 13, wherein when the implicit indication of the second random access configuration is received, the second random access configuration is applied until a successful random access message transmission.

Aspect 15: The method of any of aspects 1 through 14, wherein the second signal provides an update to a random access occasion pattern for two or more random access association periods within a random access association pattern period.

Aspect 16: The method of any of aspects 1 through 15, further comprising: initiating, based at least in part on the second signal, a timer associated with the second random access configuration; and discontinuing application of the second random access configuration upon expiration of the timer.

Aspect 17: The method of any of aspects 1 through 16, further comprising: activating the second random access configuration starting at a system information modification period subsequent when the second signal is received.

Aspect 18: A method for wireless communications at a network entity, comprising: outputting a first signal that indicates a random access configuration including a first pattern of one or more random access occasions that are available for a random access message transmission from a UE during a random access configuration period; outputting, during the random access configuration period, a second signal that indicates a second random access configuration that is an adaptation of the first random access configuration, the second random access configuration to be applied for a time duration that starts at a first time relative to a receipt time of the second signal; and obtaining at least a first random access message from the UE in a first random access occasion that is determined based at least in part on the second random access configuration.

Aspect 19: The method of aspect 18, wherein the second random access configuration provides one or more additional random access occasions than initially provided in the first random access configuration.

Aspect 20: The method of any of aspects 18 through 19, wherein the outputting the second signal comprises: outputting one or more of a paging early indication, a paging DCI transmission, a paging downlink shared channel transmission, or a DCI transmission that provides an updated pattern of random access occasions within the random access configuration period.

Aspect 21: The method of any of aspects 18 through 20, further comprising: applying the second random access configuration for one or more random access association pattern periods subsequent to a random access association pattern period in which the second signal is provided to the UE.

Aspect 22: The method of any of aspects 18 through 21, further comprising: applying the second random access configuration for one or more random access association periods subsequent to a random access association period in which the second signal is provided to the UE.

Aspect 23: The method of any of aspects 18 through 22, further comprising: applying the second random access configuration starting at a defined time duration subsequent to when the second signal is provided to the UE.

Aspect 24: The method of any of aspects 18 through 23, further comprising: applying the second random access configuration starting at a defined quantity of radio frames subsequent to a radio frame in which the second signal is provided to the UE.

Aspect 25: The method of any of aspects 18 through 24, wherein the second random access configuration is applied until an updated system information block is provided to the UE.

Aspect 26: The method of any of aspects 18 through 25, wherein the second random access configuration is applied until another signal that updates the first random access configuration is provided to the UE subsequent to the second signal.

Aspect 27: The method of any of aspects 18 through 26, wherein the second random access configuration is applied for a defined time duration or quantity of radio frames subsequent to when the second signal is provided to the UE.

Aspect 28: The method of any of aspects 18 through 27, wherein the second random access configuration is applied for a defined quantity of random access association pattern periods or random access association periods within a random access association pattern period.

Aspect 29: The method of any of aspects 18 through 28, wherein the second random access configuration is applied for a first time duration when an increased quantity of random access occasions is indicated, and is applied for a second time duration when a decreased quantity of random access occasions is indicated, and wherein the first time duration is different than the second time duration.

Aspect 30: The method of any of aspects 18 through 29, wherein the second signal provides an implicit indication or an explicit indication of the second random access configuration.

Aspect 31: The method of aspect 30, wherein when the implicit indication of the second random access configuration is provided, the second random access configuration is applied until a successful random access message transmission from the UE.

Aspect 32: The method of any of aspects 18 through 31, wherein the second signal provides an update to a random access occasion pattern for two or more random access association periods within a random access association pattern period.

Aspect 33: A UE for wireless communications, comprising one or more memories storing processor-executable code, and one or more processors coupled with the one or more memories and individually or collectively operable to execute the code to cause the UE to perform a method of any of aspects 1 through 17.

Aspect 34: A UE for wireless communications, comprising at least one means for performing a method of any of aspects 1 through 17.

Aspect 35: A non-transitory computer-readable medium storing code for wireless communications, the code comprising instructions executable by one or more processors to perform a method of any of aspects 1 through 17.

Aspect 36: A network entity for wireless communications, comprising one or more memories storing processor-executable code, and one or more processors coupled with the one or more memories and individually or collectively operable to execute the code to cause the network entity to perform a method of any of aspects 18 through 32.

Aspect 37: A network entity for wireless communications, comprising at least one means for performing a method of any of aspects 18 through 32.

Aspect 38: A non-transitory computer-readable medium storing code for wireless communications, the code comprising instructions executable by one or more processors to perform a method of any of aspects 18 through 32.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a first signal that indicates a first random access configuration including a first pattern of one or more random access occasions that are available for a random access message transmission from the UE during a random access configuration period;
receive, during the random access configuration period, a second signal that indicates a second random access configuration that is an adaptation of the first random access configuration, the second random access configuration to be applied for a time duration that starts at a first time relative to a receipt time of the second signal; and transmit at least a first random access message in a first random access occasion that is determined based at least in part on the second random access configuration.

2. The UE of claim 1, wherein the second random access configuration provides one or more additional random access occasions than initially provided in the first random access configuration.

3. The UE of claim 1, wherein, to receive the second signal, the one or more processors are individually or collectively operable to execute the code to cause the UE to:

receive one or more of a paging early indication, a paging downlink control information (DCI) transmission, a paging downlink shared channel transmission, or a DCI transmission that provides an updated pattern of random access occasions within the random access configuration period.

4. The UE of claim 1, wherein the one or more processors are individually or collectively further operable to execute the code to cause the UE to:

apply the second random access configuration for one or more random access association pattern periods subsequent to a random access association pattern period in which the second signal is received.

5. The UE of claim 1, wherein the one or more processors are individually or collectively further operable to execute the code to cause the UE to:

apply the second random access configuration for one or more random access association periods subsequent to a random access association period in which the second signal is received.

6. The UE of claim 1, wherein the one or more processors are individually or collectively further operable to execute the code to cause the UE to:

apply the second random access configuration starting at a defined time duration subsequent to receipt of the second signal that indicates the second random access configuration.

7. The UE of claim 1, wherein the one or more processors are individually or collectively further operable to execute the code to cause the UE to:

apply the second random access configuration starting at a defined quantity of radio frames subsequent to a radio frame in which the second signal is received.

8. The UE of claim 1, wherein the second random access configuration is applied until receipt of an updated system information block at the UE.

9. The UE of claim 1, wherein the second random access configuration is applied until receipt of another signal subsequent to the second signal that updates the first random access configuration at the UE.

10. The UE of claim 1, wherein the second random access configuration is applied for a defined time duration or quantity of radio frames subsequent to receipt of the second signal at the UE.

11. The UE of claim 1, wherein the second random access configuration is applied for a defined quantity of random access association pattern periods or random access association periods within a random access association pattern period.

12. The UE of claim 1, wherein the second random access configuration is applied for a first time duration when an increased quantity of random access occasions is indicated, and is applied for a second time duration when a decreased quantity of random access occasions is indicated, and wherein the first time duration is different than the second time duration.

13. The UE of claim 1, wherein the second signal provides an implicit indication or an explicit indication of the second random access configuration.

14. The UE of claim 13, wherein when the implicit indication of the second random access configuration is received, the second random access configuration is applied until a successful random access message transmission.

15. The UE of claim 1, wherein the second signal provides an update to a random access occasion pattern for two or more random access association periods within a random access association pattern period.

16. The UE of claim 1, wherein the one or more processors are individually or collectively further operable to execute the code to cause the UE to:

initiate, based at least in part on the second signal, a timer associated with the second random access configuration; and discontinue application of the second random access configuration upon expiration of the timer.

17. The UE of claim 1, wherein the one or more processors are individually or collectively further operable to execute the code to cause the UE to:

activate the second random access configuration starting at a system information modification period subsequent when the second signal is received.

18. A network entity, comprising:

one or more memories storing processor-executable code; and one or more processors coupled with the one or more memories and individually or collectively operable to execute the code to cause the network entity to:

output a first signal that indicates a first random access configuration including a first pattern of one or more random access occasions that are available for a random access message transmission from a user equipment (UE) during a random access configuration period;

output, during the random access configuration period, a second signal that indicates a second random access configuration that is an adaptation of the first random access configuration, the second random access configuration to be applied for a time duration that starts at a first time relative to a receipt time of the second signal; and obtain at least a first random access message from the UE in a first random access occasion that is determined based at least in part on the second random access configuration.

19. The network entity of claim 18, wherein the second random access configuration provides one or more additional random access occasions than initially provided in the first random access configuration.

20. The network entity of claim 18, wherein, to output the second signal, the one or more processors are individually or collectively operable to execute the code to cause the network entity to:

output one or more of a paging early indication, a paging downlink control information (DCI) transmission, a paging downlink shared channel transmission, or a DCI transmission that provides an updated pattern of random access occasions within the random access configuration period.

21. The network entity of claim 18, wherein the one or more processors are individually or collectively further operable to execute the code to cause the network entity to:

apply the second random access configuration for one or more random access association pattern periods subsequent to a random access association pattern period in which the second signal is provided to the UE, apply the second random access configuration for one or more random access association periods subsequent to a random access association period in which the second signal is provided to the UE, or apply the second random access configuration starting at a defined time duration subsequent to when the second signal is provided to the UE.

22. The network entity of claim 18, wherein the second random access configuration is applied for a first time duration when an increased quantity of random access occasions is indicated, and is applied for a second time duration when a decreased quantity of random access occasions is indicated, and wherein the first time duration is different than the second time duration.

23. A method for wireless communications at a user equipment (UE), comprising:

receiving a first signal that indicates a first random access configuration including a first pattern of one or more random access occasions that are available for a random access message transmission from the UE during a random access configuration period;

receiving, during the random access configuration period, a second signal that indicates a second random access configuration that is an adaptation of the first random access configuration, the second random access configuration to be applied for a time duration that starts at a first time relative to a receipt time of the second signal; and transmitting at least a first random access message in a first random access occasion that is determined based at least in part on the second random access configuration.

24. The method of claim 23, wherein the receiving the second signal comprises:

receiving one or more of a paging early indication, a paging downlink control information (DCI) transmission, a paging downlink shared channel transmission, or a DCI transmission that provides an updated pattern of random access occasions within the random access configuration period.

25. The method of claim 23, further comprising:

applying the second random access configuration for one or more random access association pattern periods subsequent to a random access association pattern period in which the second signal is received, applying the second random access configuration for one or more random access association periods subsequent to a random access association period in which the second signal is received, or applying the second random access configuration starting at a defined time duration subsequent to receipt of the second signal that indicates the second random access configuration.

26. The method of claim 23, wherein the second random access configuration is applied until receipt of an updated system information block at the UE.

27. A method for wireless communications at a network entity, comprising:

outputting a first signal that indicates a first random access configuration including a first pattern of one or more random access occasions that are available for a random access message transmission from a user equipment (UE) during a random access configuration period;

outputting, during the random access configuration period, a second signal that indicates a second random access configuration that is an adaptation of the first random access configuration, the second random access configuration to be applied for a time duration that starts at a first time relative to a receipt time of the second signal; and obtaining at least a first random access message from the UE in a first random access occasion that is determined based at least in part on the second random access configuration.

28. The method of claim 27, wherein the outputting the second signal comprises:

outputting one or more of a paging early indication, a paging downlink control information (DCI) transmission, a paging downlink shared channel transmission, or a DCI transmission that provides an updated pattern of random access occasions within the random access configuration period.

29. The method of claim 27, further comprising:

applying the second random access configuration for one or more random access association pattern periods subsequent to a random access association pattern period in which the second signal is provided to the UE, applying the second random access configuration for one or more random access association periods subsequent to a random access association period in which the second signal is provided to the UE, or applying the second random access configuration starting at a defined time duration subsequent to when the second signal is provided to the UE.

30. The method of claim 27, wherein the second random access configuration is applied until an updated system information block is provided to the UE, until another signal that updates the first random access configuration is provided to the UE subsequent to the second signal, or for a defined time duration or quantity of radio frames subsequent to when the second signal is provided to the UE.

* * * * *